United States Patent
Russell (12)

(10) Patent No.: US 6,732,762 B2
(45) Date of Patent: May 11, 2004

(54) PRESSURE-CONTAINING PLUG FOR A TUBULAR PASSAGEWAY

(76) Inventor: Larry R. Russell, 3607 Gramercy, Houston, TX (US) 77025-1320

( * ) Notice: Subject to any disclaimer, the term of this patent is extended or adjusted under 35 U.S.C. 154(b) by 161 days.

(21) Appl. No.: 10/041,729

(22) Filed: Jan. 8, 2002

(65) Prior Publication Data

US 2002/0101040 A1 Aug. 1, 2002

Related U.S. Application Data

(60) Provisional application No. 60/261,306, filed on Jan. 12, 2001.

(51) Int. Cl.$^7$ ............................................... F16L 55/12
(52) U.S. Cl. ............................. 138/89; 138/93; 138/90; 405/170
(58) Field of Search ............................. 138/97, 89, 93, 138/90; 405/170

(56) References Cited

U.S. PATENT DOCUMENTS

| | | | | |
|---|---|---|---|---|
| 4,332,277 A | * | 6/1982 | Adkins et al. ................. | 138/89 |
| 4,465,104 A | * | 8/1984 | Wittman et al. ............... | 138/89 |
| 4,658,860 A | * | 4/1987 | Reaux .......................... | 138/89 |
| 4,875,615 A | * | 10/1989 | Savard ........................ | 228/119 |
| 5,119,861 A | * | 6/1992 | Pino ............................ | 138/89 |
| 6,581,642 B1 | * | 6/2003 | Ritchie et al. ................. | 138/90 |

OTHER PUBLICATIONS

T.D. Williamson, Inc., Lock–O–Ring, Flanges and Plugs, Mar. 1, 1981.
Oceaneering, The Smart Vent, 2000.
Thaxton, Thaxon High Pressure Pipe Stoppers, 2000.
T.D. Williamson, Inc., Wedge–Lock Pipe Plug, Jan. 1, 1980.
Hydro Tech Systems, General Product Specification Hydroplug, 2000.
International Piping Services Company, Close–Sure Flanged Weld–On Pressure Retention Split Tees, 2000.

* cited by examiner

*Primary Examiner*—Patrick Brinson
(74) *Attorney, Agent, or Firm*—Elizabeth R. Hall

(57) ABSTRACT

An improved plug device 10 for sealing an internal tubular passageway in a predetermined location against pressure and flow applied from one side. The plug 10 is selectively inserted and retrieved from the tubular passageway using an installation tool 200. The plug 10 has an elastomeric seal 72 and multiple latch dogs 40 that reciprocate in an axial direction to engage or not engage the tubular passageway. An elastomeric seal 72 of the plug 10 is manipulated to cause it to recess during the installation and retrieval of the plug device 10 to minimize scuffing the seal 72. Multiple latch dogs housed in the plug are radially moved outward to engage a prepared internal groove in the tubular passageway, then the elastomeric seal 72 is relaxed to bias against the interior of the bore of the tubular passageway. The plug is easily installed and removed by robots or remote manipulators.

23 Claims, 15 Drawing Sheets

PRESSURE-CONTAINING PLUG FOR A TUBULAR PASSAGEWAY

CROSS-REFERENCE TO RELATED APPLICATION

The present application, pursuant to 35 U.S.C. 111(b), claims the benefit of the earlier filing date of provisional application Ser. No. 60/261,306 filed Jan. 12, 2001, and entitled "Pressure-Containing Plug for a Tubular Line." The present invention is also related to another patent application Ser. No. 09/788,970 filed Feb. 19, 2001 entitled "Antiextrusion Device."

BRIEF DESCRIPTION OF THE INVENTION

The present invention relates in general to an improved plug device for sealing an internal tubular passageway in a predetermined location against pressure and flow applied from either side. More particularly, the invention relates to a remotely installable and removable completion plug for pipeline hot-taps.

BACKGROUND OF THE INVENTION

Two very common problems in the currently available pipeline plugs are that they often mar the bore of the pipe and they cannot hold high pressure from both directions. Another common problem with currently available pipeline plugs is that they are difficult to remotely install or remove. There are a number of applications for pipeline plugs, either land-based or underwater, which cannot be directly serviced by personnel, such service being performed by robots or by personnel working from some distance utilizing submersible craft with remote manipulators. One limitation of robots and remote manipulators is that they cannot reliably or efficiently perform fine mechanical maneuvers such as tightening sets of screws or bolts.

A large variety of plugging means exists for application as packers in wells, and some of this technology has been adapted to use for pipeline plugging. These devices typically use tapered wedges sometimes referred to as slips to grip the bore of the pipe and compress rubber seal rings with rectangular cross sections to provide sealing. Examples of this type of plug are the HydroTech Systems Hydroplug, the Thaxton plug, and T. D. Williamson, Inc.'s Wedge-Lock Pipe Plug. This type of plug does avoid having the seal scrubbed against the bore of the pipe while the plug is being shifted within the bore of the pipe. However, the gripping wedges tend to distort or mar the bore of the pipe, particularly when high pressures are retained by the plug. Pressure in one direction tends to tighten the wedges, while pressure in the other direction tends to loosen the wedges. Thus, these wedges are suitable for retaining pressure from only one direction.

A second type of plug is exemplified by T. D. Williamson, Inc.'s Lock-O-Ring plug. This plug has a external circumferential latching groove and an O-ring on a short cylindrical body. The plug is landed inside a prepared flange or body which has an internal circumferential groove containing a split latching ring recessed into that groove and shaped to be forced into engagement with the plug groove while still being partially engaged in the flange or body groove. In order to engage the plug groove, the latching ring is caused to distort to a smaller diameter by means of screws which are mounted in multiple equispaced threaded radial holes in the flange or body groove with their tips engaging the outer diameter of the latching ring. Screwing the screws inwardly causes the latching ring to engage the groove of the plug. A ball check valve which may be opened by insertion of a pin to displace the ball from its seat is provided to permit pressure equalization across the seal of the plug. The disadvantages of this type of plug are a tendency to cock in the bore into which it is installed because of its short length and the variations in O-ring friction against noncircular bores. A further disadvantage is the tendency of the radial screw holes to leak and a need for access to the heads of the screws for actuating or releasing the latching ring. This type of plug is particularly difficult to remotely install or remove.

Thus, a need exists for a plug suitable for sealing a bore that can easily be installed or removed by robots and remote manipulators.

A further need exists for a passive bidirectional seal having significant preloading contact with the bore, which is not scruffed during its installation.

SUMMARY OF THE INVENTION

The invention contemplates an improved plug device for sealing an internal tubular passageway in a predetermined location against pressure and flow applied from one side. The plug is selectively inserted and retrieved from one direction by means of a mandrel. The plug is latched into a prepared internal groove in the tubular passageway. The seal of the plug is manipulated in order to cause it to recess during installation and retrieval in order to avoid scuffing.

One aspect of the present invention is a sealing plug for selectively plugging a tubular flow passage, either temporarily or permanently, comprising: (i) a body assembly; (ii) a sealing assembly having an annular elastomeric seal; a static seal end, bonded to a one end of the elastomeric seal on an inner side of the static seal end and anchored to the body assembly on an outward side of the static seal end; and a movable seal end, bonded to a second opposed end of the elastomeric seal, wherein when said movable seal end is displaced in a direction going away from the static seal end the elastomeric seal is tensioned and when the movable end is moved back towards the static seal end the tension on the seal is relaxed; (iii) a reciprocable piston housed within the body assembly and connected to the movable seal end, said piston movable between a first position and a second position, wherein when said piston is in the first position the elastomeric seal is tensioned and when the piston is in the second position the elastomeric seal is relaxed; and (iv) means for moving the piston between the first and second position.

In accordance with a second aspect of the invention is a completion plug for a hot-tap fitting having: (i) a cylindrical body assembly; (ii) an elastomeric seal assembly consisting of an annular seal with an anchored end and a moveable end, wherein when the moveable seal end is moved to a first position the seal is stretched and when the movable end is moved to a second position the seal is relaxed; (iii) means for reciprocably moving said movable end between the first and second position; (iv) a plurality of radially extensible latch dogs housed within the body assembly, wherein said latch dogs are retractable to an inside position within the body assembly and extendable to an outside position wherein a portion of the latch dogs extend outside of the body assembly; and (v) means for moving the latch dogs radially between the inside and outside position.

In accordance with a third aspect of the invention is a tool for installing/retrieving a plugging device into a tubular passage. The tool comprises (i) a cylindrical stinger configured to fit within the bore of the sealing plug, said stinger having an elongated body with multiple flow ports, wherein each flow port selectively communicates pressure to a corresponding flow port in the bore of the sealing plug; (ii) means for selectably securing said annular stinger to the sealing plug; and (iii) means for guiding the sealing plug attached to the stinger into position in the tubular flow passageway.

In accordance with a fourth aspect of the invention is a plugging device for a hot-tap fitting comprising: (a) a cylindrical sealing plug having (i) a cylindrical body assembly having a concentric blind bore; (ii) an elastomeric seal assembly consisting of an annular seal with an anchored end and a moveable end, wherein when the moveable seal end is moved to a first position the seal is stretched and when the movable end is moved to a second position the seal is relaxed; (iii) means for reciprocably moving said movable end between the first and second position; (iv) a plurality of radially extensible latch dogs housed within the body assembly, wherein said latch dogs are retractable to an inside position within the body element and extendable to an outside position wherein a portion of the latch dogs extend outside of the body element; and (v) means for moving the latch dogs radially between the inside and outside position; and (b) an installation tool for installing or retrieving the sealing plug in a tubular flow passageway comprising (i) a cylindrical stinger configured to fit within the bore of the sealing plug, said stinger having an elongated body with multiple stinger flow ports, wherein each stinger flow port selectively communicates pressure to a corresponding bore flow port in the bore of the sealing plug; (ii) means for selectably securing said stinger to the sealing plug; and (iii) means for guiding the sealing plug attached to the stinger into position in the tubular flow passageway.

Yet another aspect of the invention is a process for sealing a tubular passageway against pressure and flow, said process comprising:
  (a) selecting the tubular passageway to be sealed by a sealing plug, said sealing plug including (i) a cylindrical body element having an interior concentric blind bore; (ii) a seal assembly consisting of an elastomeric annular seal with an anchored end and a moveable end, wherein when the moveable seal end is moved to a first position the seal is stretched and when the movable end is moved to a second position the seal is relaxed; (iii) means for reciprocably moving said movable end between the first and second position; (iv) a plurality of radially extensible latch dogs housed within the body element, wherein said latch dogs are retractable to a retracted position within the body element and extendable to an extended position wherein a portion of the latch dogs extend outside of the body element; and (v) means for reciprocably moving latch dogs between the extended position and the retracted position;
  (b) attaching an installation tool to the sealing plug, wherein the installation tool comprises (i) a cylindrical stinger configured to fit within the blind bore of the sealing plug, said stinger having an elongated body with multiple stinger flow ports, wherein each stinger flow port selectively communicates pressure to a corresponinng bore flow port in the blind bore of the sealing plug for controlling the means for reciprocably moving the moveable seal end and the latch dogs; (ii) means for selectively securing said annular stinger to the sealing plug; and (iii) means for guiding the sealing plug attached to the stinger into position for sealing the tubular flow passageway;
  (c) moving the movable end of the elastomeric seal to the first position, thereby stretching the elastomeric seal;
  (d) inserting the sealing plug into the tubular passageway while the elastomeric seal is stretched and the latch dogs are in the retracted position;
  (e) moving the latch dogs to the extended position to bias against and engage an interior surface of the tubular passageway; and
  (f) moving the elastomeric seal to the second position to relax the seal to bias the seal against the interior surface of the tubular passageway.

The foregoing has outlined several aspects of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed might be readily utilized as a basis for modifying or redesigning the structures for carrying out the same purposes as the invention. It should be realized that such equivalent constructions do not depart from the spirit and scope of the invention as set forth in the appended claims.

BRIEF DESCRIPTION OF THE DRAWINGS

The novel features which are believed to be characteristic of the invention, both as to its organization and methods of operation, together with the objects and advantages thereof, will be better understood from the following description taken in conjunction with the accompanying drawings, wherein.

DETAILED DESCRIPTION OF THE INVENTION

The present invention relates to a reliable plug device for sealing an internal tubular passageway. The plug device is particularly applicable for use as a completion plug for pipeline hot-taps. It is designed to be installable and removable in subsea environments using robots or remote manipulators.

Figures 1, 2:
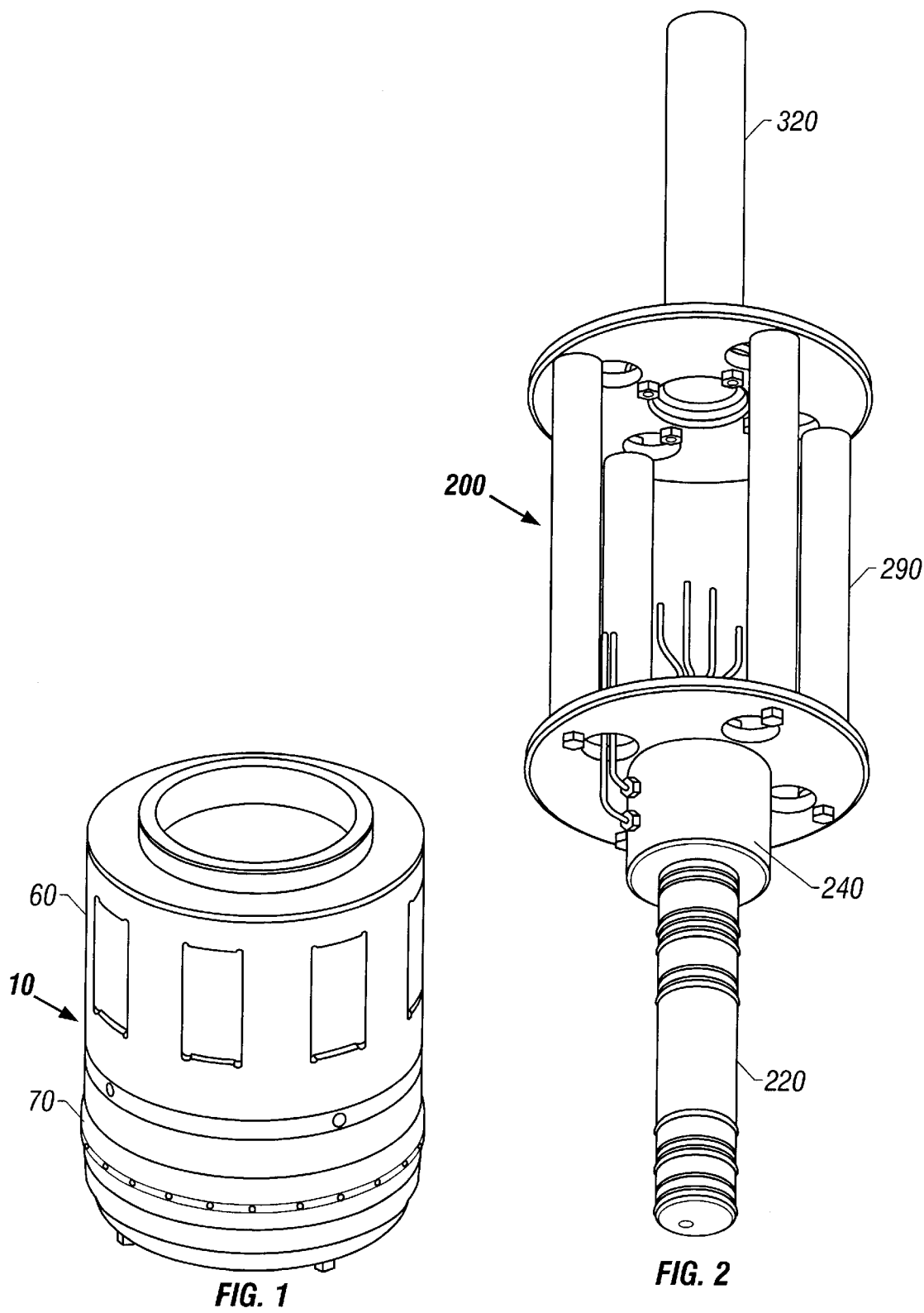
FIG. 1 is a perspective view of a plug device for a tubular line.
FIG. 2 is a side view of an installation tool used to install and retract the plug device of FIG. 1.

Referring now to the drawings, and initially to FIGS. 1 and 2, it is pointed out that like reference characters designate like or similar parts throughout the drawings. The Figures, or drawings, are not intended to be to scale. For example, purely for the sake of greater clarity in the drawings, wall thickness and spacing are not dimensioned as they actually exist in the assembled embodiment.

A. The Sealing Plug

The sealing plug 10 of the present invention is seen in FIG. 1 and the installation tool 200 is shown in FIG. 2.

The body assembly of plug 10 includes body 160, seal assembly 70, piston 90, load transfer washer 110, cylinder end cap 120, bore cap 130, latch dog housing 60, latch dogs 40, and latch cylinder end 50. An exploded view of these component parts of sealing plug 10 is illustrated in FIG. 3.

The plug 10 has an overall cylindrical shape with its length typically comparable to its outer diameter. The sealing plug 10 of this invention is shown prior to being assembled with its installation mandrel in the quarter sectional view of FIG. 4A. The forward end, which is the portion of the plug which is first inserted into the bore to be sealed, is shown on the bottom of FIGS. 4A and 5.

Figure 4A:
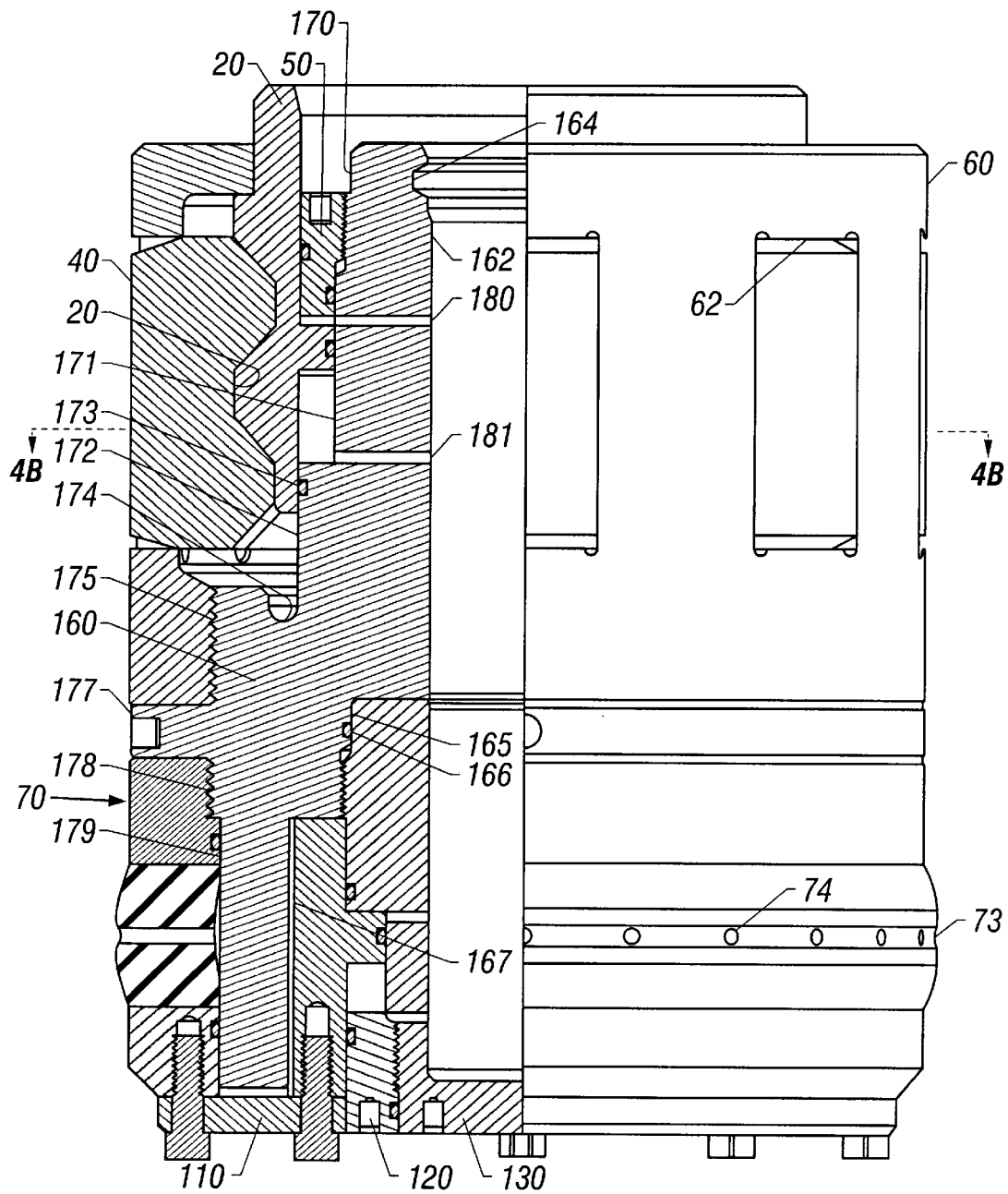
FIG. 4A illustrates a longitudinal quarter sectional view of the sealing plug.

The details of body 160 of plug 10 are shown in FIG. 4A. The body 160 has an interior through bore 162 with a latchable female groove 164 at its outer end for engagement by the installation mandrel. At its forward end, body 160 has a first counterbore 165 with a female thread and female O-ring groove in which O-ring 166 is mounted. Adjoining first counterbore 165 and farther forward is second, larger counterbore 167. Bore 162, first counterbore 165, and second counterbore 167 are connected by transverse shoulders. The exterior of body 160 has, from its outer end, threaded first cylindrical section 170, a first transverse shoulder, larger second cylindrical section 171, a second transverse shoulder, third cylindrical section 172 having a diameter increased from that of section 171 and carrying a male O-ring groove and O-ring 173, clearance face groove 174 and third transverse shoulder, male threaded fourth cylindrical section 175 having a larger diameter than that section 172, a fourth transverse shoulder, and towards the middle of body 160 its largest outer diameter cylindrical section 177. One or more shallow radial holes are provided in cylindrical section 177 for engagement by pin spanners. Forward of section 177 is a transverse shoulder adjoining male thread 178, with constant diameter cylindrical section 179 continuing to the forward end of body 160. Radial flow ports 180 and 181 pass from bore 162 through cylindrical section 171.

Figure 3:
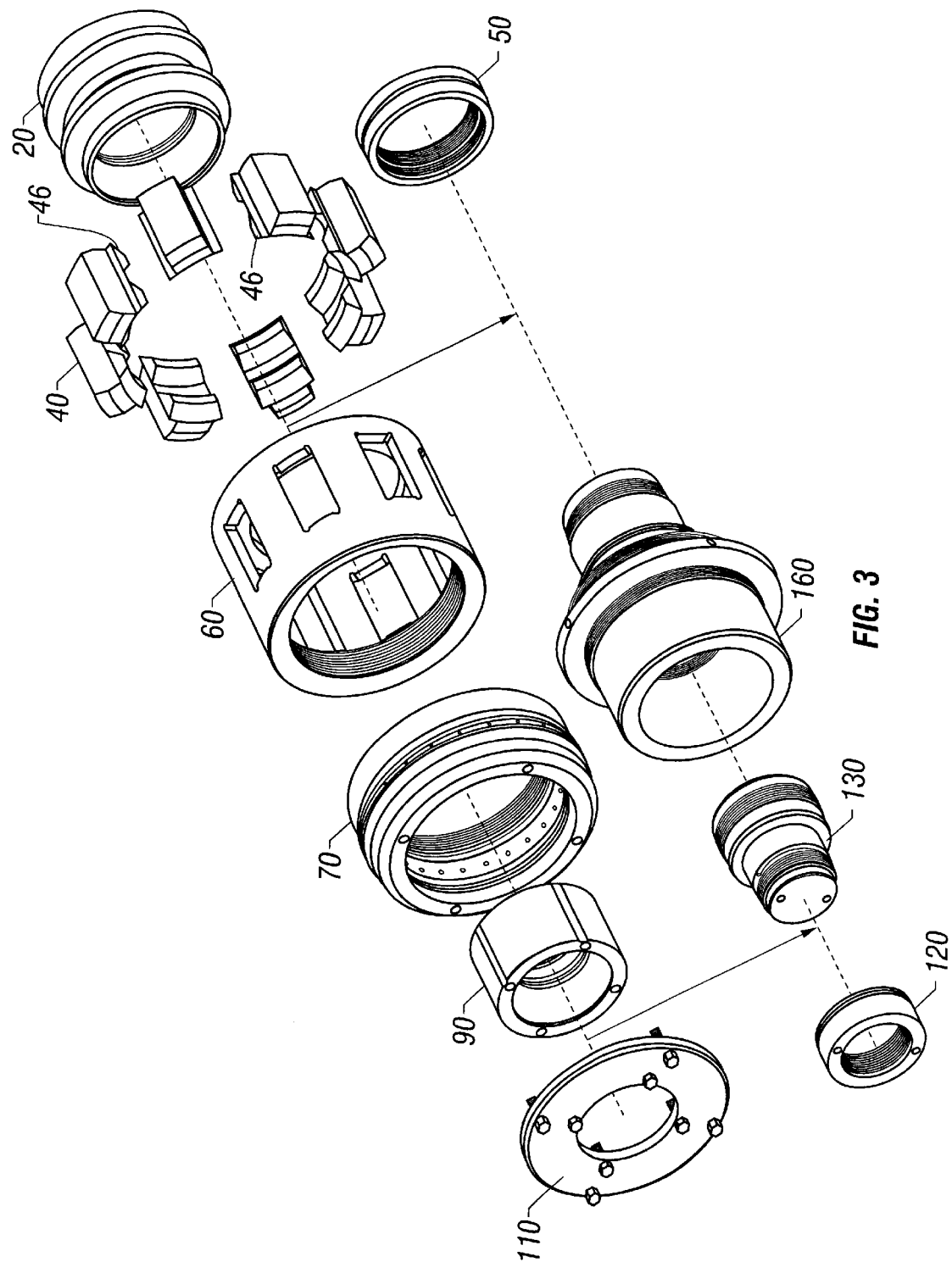
FIG. 3 shows an exploded perspective view of the component parts of the sealing plug.
Figure 5:
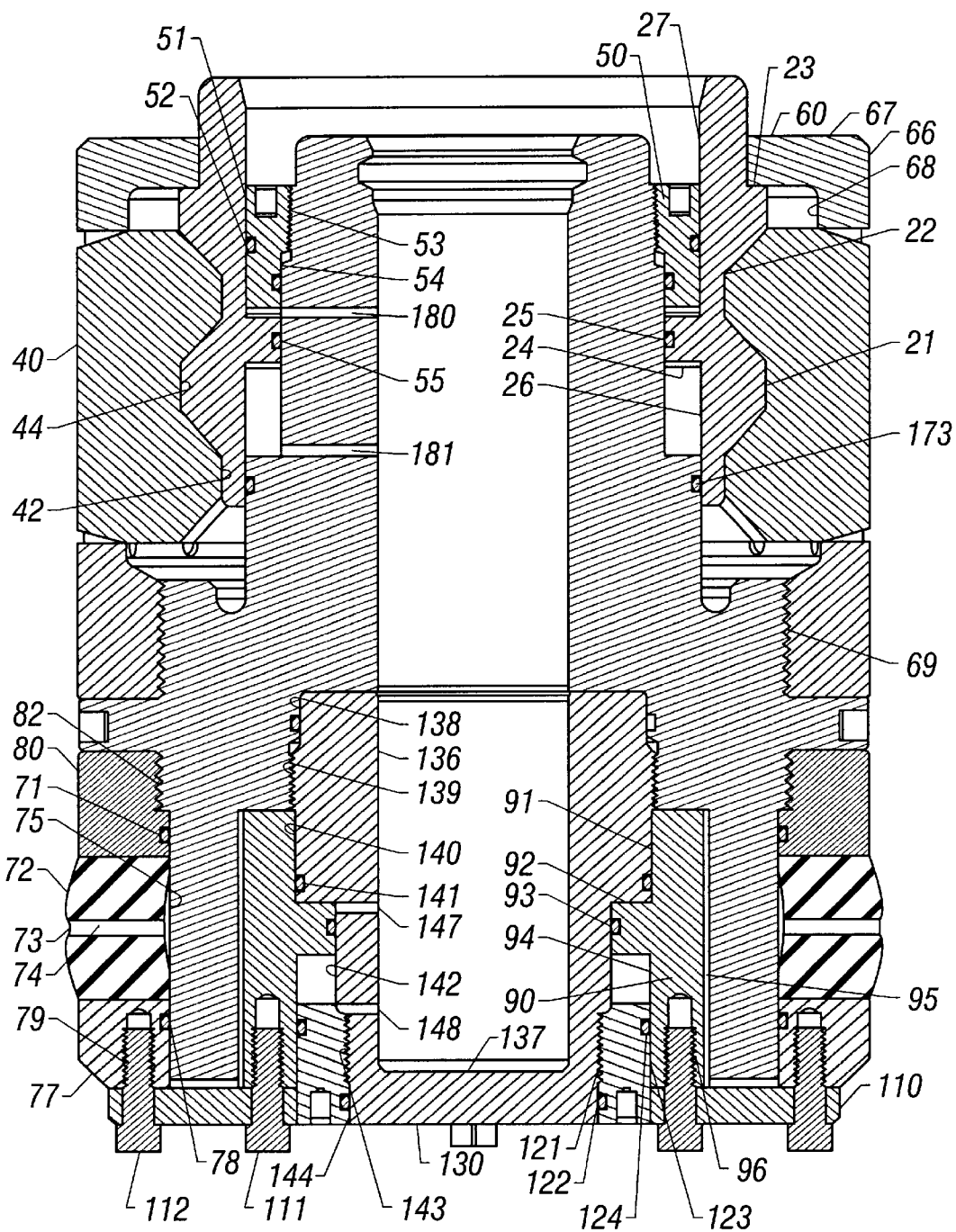
FIG. 5 is a longitudinal sectional view of the sealing plug shown in FIG. 4A.

Bore cap 130, illustrated in FIGS. 3 and 5, has a partial bore 136 with the same diameter as bore 162 of body 160 extending through most of its length and terminating in transverse bulkhead 137. The exterior of bore cap 130 has, from its outer end, first cylindrical section 138 to which O-ring 166 seals, first male thread 139 which is screwed into the female thread of the first counterbore 165 of body 160, second cylindrical section 140 containing a male O-ring groove carrying O-ring 141, a transverse shoulder, reduced diameter third cylindrical section 142, further reduced diameter second male thread 143, and slightly smaller diameter cylindrical section 144. Face spanner holes are provided at the forward side of bulkhead 137. Radial flow ports 147 and 148 pass from bore 136 through third cylindrical section 142.

Double acting piston 90, illustrated in FIGS. 3 and 5, has from its outer end, first interior counterbore 91, inwardly projecting bulkhead 92 which serves as a pressure responsive piston head carrying a female O-ring groove and O-ring 93, and on its forward end second interior counterbore 94. O-ring 93 seals to cylindrical surface 142 of bore cap 130. The outer surface 95 is a cylinder of constant diameter and can be made to fit closely to cylindrical bore section 167 in the body 160 if grooved to permit fluid to communicate with the outer transverse end of piston 90. Otherwise, piston 90 is made to loosely fit in forward cylindrical bore 167 of body 160. The provision of grooving or an annular passage on the outer surface 95 of piston 90 is necessary to render the piston pressure balanced for the ambient pressure on the forward end of the plug 10. The forward transverse end of piston 90 has an array of tapped holes 96.

Annular cylinder end cap 120, shown in FIGS. 3 and 5, has an internal thread 121 which is screwed into thread 143 of bore cap 130. Female O-ring 122 is contained in a groove on the forward end of the bore through end cap 120 and seals to the cylindrical surface 144 of bore cap 130. The outer cylindrical surface 123 of cylinder end cap 120 contains a male O-ring groove holding O-ring 124, which seals to second interior counterbore 94 of piston 90. The forward transverse end of end cap 120 is provided with holes for engagement by a face spanner. Bore cap 130 and cylinder end cap 120 form cavities in which bulkhead 92 of piston 90 may reciprocate in an axial direction. Piston 90 is thus actuable by means of simultaneous and opposite fluid flows through ports 147 and 148.

An elastomeric stretchable seal assembly 70, shown in FIGS. 3 and 5, consists of a static seal anchor 80, molded bidirectional seal 72, and movable seal end 77. This type of seal is disclosed in copending U.S. patent application: "Seal Assembly, Its Use and Installation," Ser. No. 09/788,791 filed Feb. 19, 2001 and incorporated herein by reference. Seal anchor 80 is of annular construction with a female thread 82 and a female O-ring groove containing O-ring 71 in its bore and its outer diameter less than the bore to which the seal will be engaged for sealing by only a minimal clearance. Thread 82 is mated to thread 178 of body 160, while O-ring 71 seals to cylindrical surface 179 of body 160.

Seal 72 is molded to have one transverse face bonded to anchor 80 and the other transverse face bonded to moveable seal end 77. At rest, seal 72 has a convex outer diameter, which is appreciably larger than that of the bore to which it will seal. An external central annular groove 73 is connected by means of multiple radial ports 74 to the interior face of the seal 75, which is cylindrical with a central annular groove. The elastomer used to make the seal 72 typically is chosen to have a high tear and bond strength. Thus, the seal 72 is made to have a high extensibility without tearing. The elastomer must also be chosen to be chemically compatible with the fluids to be sealed. Optionally, the elastomer may be modified to enhance its coefficient of friction with the bore 181 by the addition of modifiers such as silica fluor or tungsten carbide grit or other special elastomer compounding.

Moveable seal end 77 is an annular ring with a female O-ring groove containing O-ring 78 on its interior cylindrical face. The exterior of moveable seal end 77 has a cylindrical surface of the same diameter as that of seal anchor 80 and a chamfer on its forward outer end. An array of tapped holes 79 is on the forward transverse end of moveable seal end 77.

Load transfer washer 110 is bolted to the forward transverse ends of piston 90 and moveable seal end 77 by bolts 111 and 112 through an array of holes in load transfer washer 110 matching and engaged into holes 96 and 79, respectively. Load transfer washer 110 thereby transmits reciprocating motions of piston 90 to seal assembly 70, so that piston 90 can be used to selectively stretch, relax or compress seal 72.

Latch dog housing 60 has a constant outer diameter cylindrical section 66 with a transverse bulkhead 67 at its outer end. The bore 68 forward of bulkhead 67 is relieved, while forward of bore 68 the inner diameter is reduced at female thread 69. Female thread 69 is engaged with male thread 178 of body 160, and the forward transverse end of latch dog housing 60 abuts the fourth transverse shoulder of body 160. Multiple substantially rectangular openings 62 are circumferentially equispaced and cut with parallel walls radially into latch dog housing 60 between relieved bore 68 and the outer cylindrical surface 66.

Figure 4B:
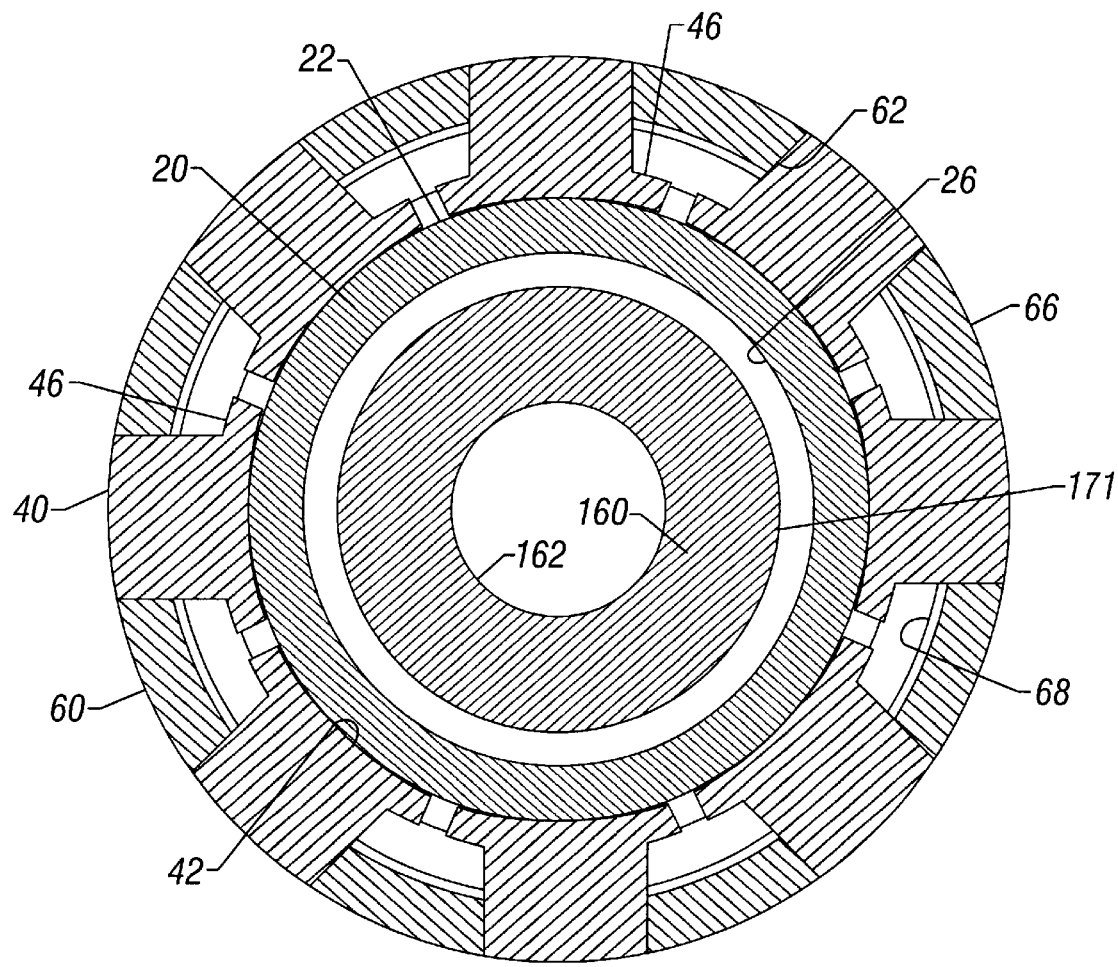
FIG. 4B is a transverse cross-sectional view taken along line 4B—4B of FIG. 4A.

Multiple latch dogs 40 are closely housed within the multiple rectangular openings 62 of the latch dog housing 60. The latch dogs are segments cut from a source ring with constant outer diameter and a land-and-groove pattern on the interior face. The cylindrical faces of the two lands 42 have the same diameter and are joined to the adjacent larger diameter groove 44 by frustro-conical transition shoulders. Similar frustro-conical transition shoulders join the lands 42 to the transverse end faces of the source ring from which the dogs are cut, and frustro-conical bevels are provided between the outer cylindrical face and the transverse ends. The latch dogs 40 are cut from their source ring with parallel planar sides parallel to and offset from the axis of the source ring, and with relatively thin and short circumferentially extending ears 46 on the interior side in the land regions of the dogs, as shown in FIGS. 3 and 4B.

Double acting latch piston 20 is an annular ring with two external lands 21 and two adjacent reduced diameter cylindrical sections hereinafter termed grooves 22 joined by frustro-conical transition shoulders on its forward external cylindrical surface. The alternating lands and grooves are comateable with lands 42 and groove 44 of latch dogs 40 when the latch dogs are in a retracted position. Whenever the lands 21 of the latch piston 20 are shifted to a position where they are radially inward of latch dog lands 42, the latch dogs 40 are forced into a fully extended position. Whenever the latch piston 20 is shifted from either the position which permits full latch retraction or full latch dog extension, the frustro-conical transition surfaces of both the latch dogs 40 and the latch piston 20 serve as wedging ramps to guide and/or compel the latch dogs to move radially in their rectangular openings 62 in the latch dog housing 60. Outward of the outer land of latch piston 20 is a transverse shoulder 23 which serves as a travel limiting stop for piston 20 when it abuts transverse bulkhead 67 of latch dog housing 60. Adjacent shoulder 23 at the extreme outer end of piston 20 is a cylindrical section of diameter intermediate between that of lands 21 and grooves 22. The bore of latch piston 20 has a central bulkhead 24 containing a female O-ring groove and O-ring 25 which seals to the second cylindrical section 171 of body 160. The bulkhead 24 serves as the head of latch piston 20. Adjoining bulkhead 24 are transverse shoulders connecting to forward 26 and outer 27 cylindrical counterbores having the same diameter. Counterbore 26 sealingly mates with O-ring 173.

It is desirable to retain the latch dogs 40 against the surface of piston 20 when the latch dogs are retracted. In a first means of accomplishing this, the body of piston 20 is magnetized, and the material of the latch dogs is made of a hardened low alloy steel which is strongly attracted to the magnetic piston. A second means of accomplishing this maintenance of contact is to provide the individual dogs with springs which bear against the cylindrical bore 68 of latch dog housing 60 in the manner shown in U.S. Pat. Nos. 4,407,377 and 4,491,187. A third means is to provide similar holes or grooves in the circumferential direction in each of the latch dogs 40 and then install a garter spring through all such holes so that the spring will continuously urge the latch dogs 40 into radial contact with piston 20.

Annular latch cylinder end 50 has a cylindrical outer diameter 51 containing an O-ring groove mounting O-ring 52 which seals to outer cylindrical counterbore 27 of latch piston 20. At the outer end of its bore, latch cylinder end 50 has female thread 53 which is screwed into the male thread on first cylindrical face 170 of body 160. Forward of thread 53 is a transition shoulder and cylindrical bore 54 which contains a female O-ring groove holding O-ring 55 which seals to second cylindrical surface 171 of body 160. A pair of annular cavities are thus established between body 160, latch cylinder end 50, and latch piston 20 so that the central bulkhead 24 of latch piston 20 functions as a hydraulic piston which is caused to reciprocate by insertion or removal of fluid from said cavities through ports 180 and 181.

Figure 6:
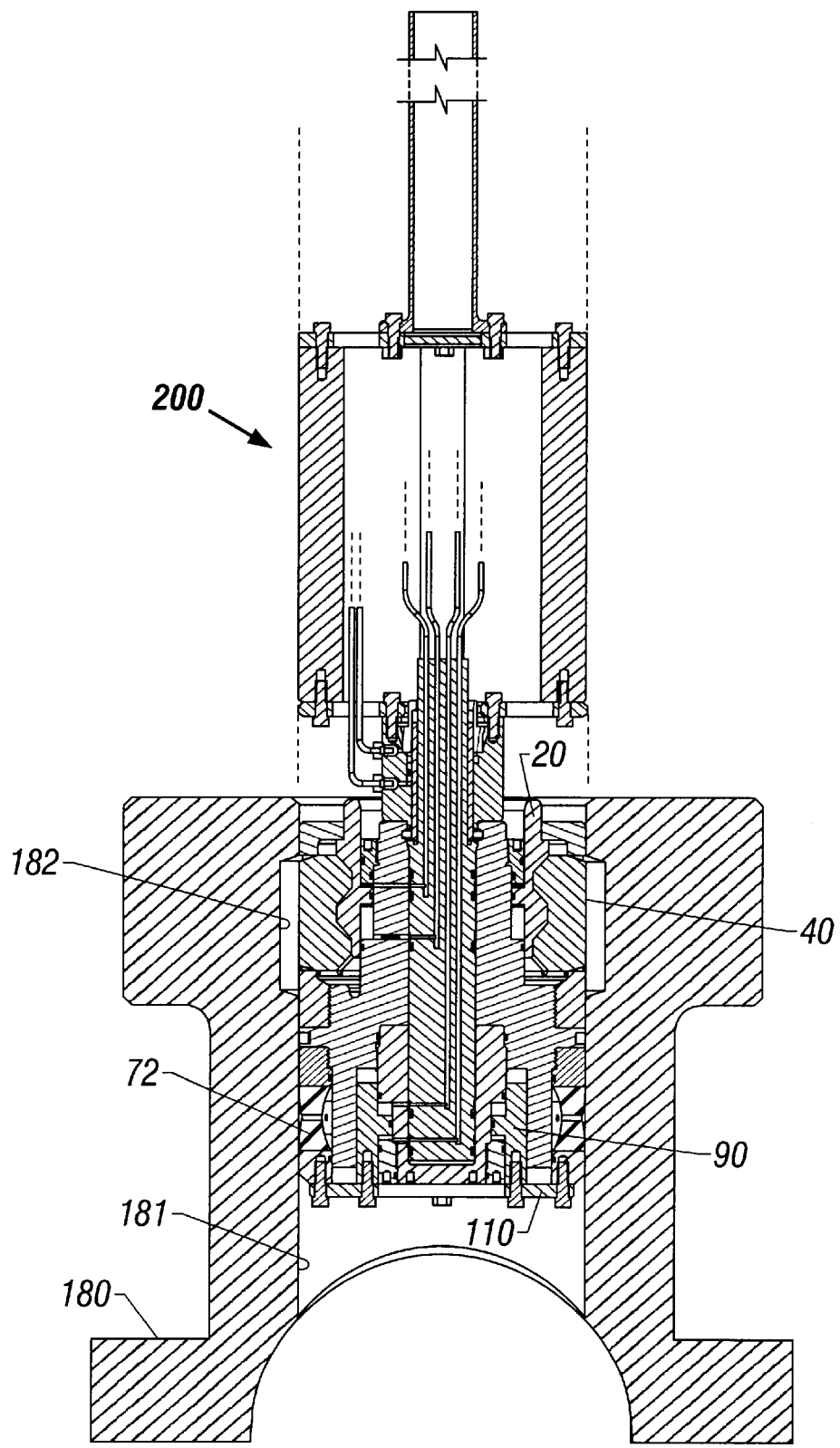
FIG. 6 is a longitudinal sectional view showing the sealing plug being inserted into the branch bore of a hot-tap fitting with an installation tool.

Referring now to FIG. 6, a cross-sectional view of the necked half 180 of a hot tap fitting is shown with the sealing plug 10 being inserted into the neck bore 181. The hot tap fitting is essentially a split repair clamp with a neck extending transversely normal to and intersecting the pipe and fitting axes and located centrally on one side of the fitting. Typically used with such a fitting is a isolation valve which is mounted on the end flange of neck bore 181, but is not shown here. The isolation valve, the other half of the hot tap fitting, and the pipe are not shown in this material because they are not directly pertinent to the operation of the sealing plug device of this invention. The outer bore of the neck has a female groove 182 which is configured to receive the latch dogs 40 of sealing plug 10 when they are expanded. Also shown in FIG. 2 is the installation tool 200 which is used to install and remove the sealing plug 10.

Figure 15:
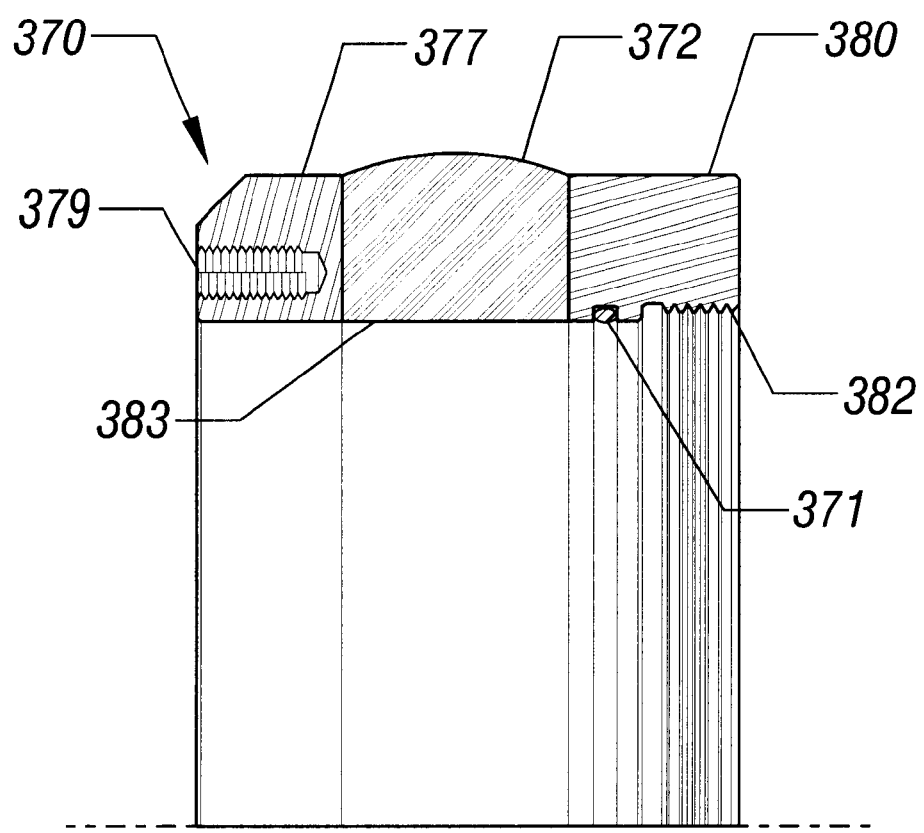
FIG. 15 is quarter-sectional view of an alternative stretchable seal assembly.

FIG. 15 shows an alternative seal assembly 370 which may be substituted directly in place of seal assembly 70 in plug 10. Alternative seal assembly 370 consists of static seal anchor 380, molded unidirectional seal 372, and moveable seal end 377. This type of seal is also disclosed in copending U.S. Patent Application entitled "Seal Assembly, Its Use and Installation," Ser. No. 09/788,791. Seal anchor 380 is of annular construction with a female thread 382 and a female O-ring groove containing O-ring 371 in its bore. The outer diameter of seal anchor 380 is only slightly less than that of the bore 181 to which seal 372 will be sealing so that clearance will exist with the bore, but the seal extrusion gap is minimized. Thread 382 is mated to thread 178 of body 160, while O-ring 371 seals to cylindrical surface 179 of body 160.

Alternative seal 372 is an elastomer molded to have one transverse face bonded to seal anchor 380 and the other transverse face bonded to moveable seal end 377. As molded, seal 372 has a cylindrical inner surface of the same diameter as the adjoining inner cylindrical face of seal anchor 380. The as-molded exterior face of alternative seal 372 has a smooth arcuate convex cross-section with it maximum outer diameter sufficiently larger than the bore 181 to which seal 372 will seal that a very large static bias force or presqueeze would exist between seal 372 and bore 181. The arcuate exterior face of seal 372 has its minimum outer diameter where it is bonded to seal anchor 380 and moveable seal end 377. The minimum outside diameters on either side of the central portion of seal 372 are matched to the outer diameter of the adjacent pieces.

Moveable seal end 377 is an annular ring with its outer and inner cylindrical diameters the same as the outer and inner cylindrical diameters for seal anchor 380. A chamfer is provided on the forward end of seal end 380. An array of tapped bolt holes 379 is on the forward transverse end of moveable seal end 377.

The elastomer of seal 372 typically will have high tear and bond strength, so that it is highly extensible without tearing. The elastomer will be chosen for its chemical compatibility with the fluids to be sealed. The elastomer may be modified by the addition of materials such as silica flour or tungsten carbide grit to enhance its coefficient of friction with bore 181.

B. The Installation Tool

Figure 7:
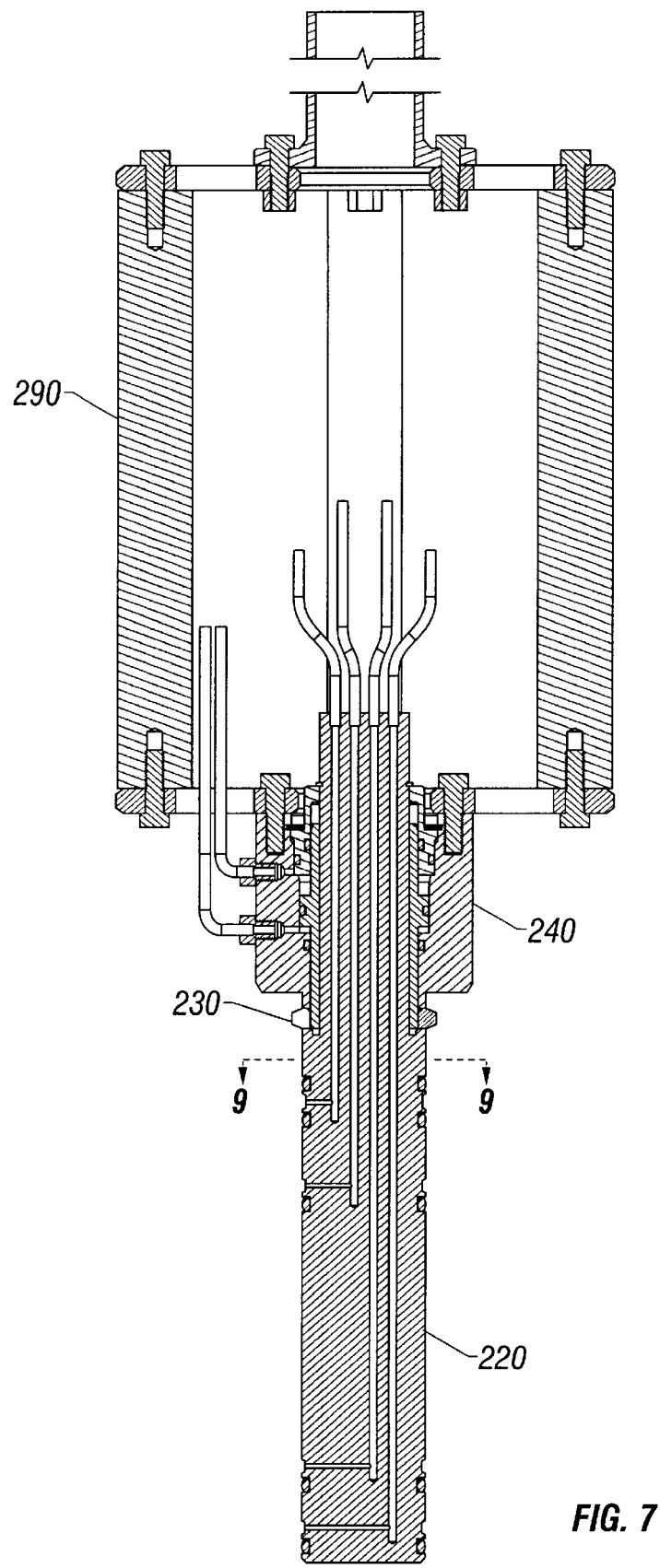
FIG. 7 shows a longitudinal sectional view of the installation tool shown in FIG. 6.

Referring to FIG. 7, the installation tool 200 is shown in half section with it major component parts labeled. The major components of the installation tool are a stinger 220, latch split ring 230, the latch activator assembly 240, and guide means 290.

Figure 8A:
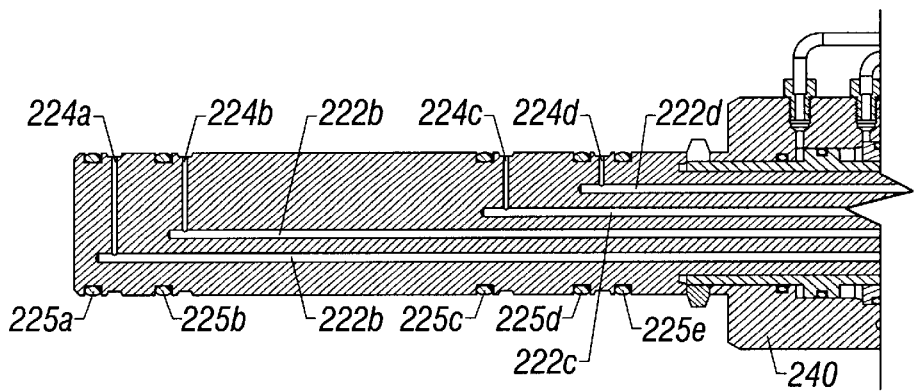
FIG. 8A shows a longitudinal sectional view of the stinger on the forward end of the installation tool shown in FIG. 7.

The installation tool 200 has its cylindrical stinger 220 sized to be selectively axially entered into and removed from the bore 162 of body 160 of the sealing plug 10. The outer end of stinger 220, as shown in FIG. 8A, has a reduced diameter section joined to its main section by an intermediate transverse shoulder and with a male snap ring groove at its extreme outer end. Multiple gundrilled flow ports 222a,b,c,d are positioned within stinger 220 parallel to the axis of stinger 220. These flow ports 222a,b,c,d are respectively intersected near their interior ends by transverse ports 224a,b,c,d, which are positioned to respectively communicate with flow ports 148, 147, 181, and 180 of sealing plug 10. Transverse flow ports 224a,b,c,d are isolated from each other and the bore of neck 181 of the hot tap fitting by O-rings 225a,b,c,d,e mounted in male O-ring grooves on the outer cylindrical surface of stinger 220. O-rings 225a,b,c,d,e seal to bore 162 of body 160 and bore 136 of bore cap 130 of sealing plug 10. Typically, the exterior of stinger 220 is slightly relieved to form an annular groove at the outer end of each of transverse flow ports 224a,b, c, d so that the ports in sealing plug 10 and installation tool 200 do not have to be in precise rotational alignment to have acceptable flow.

Figure 8B:
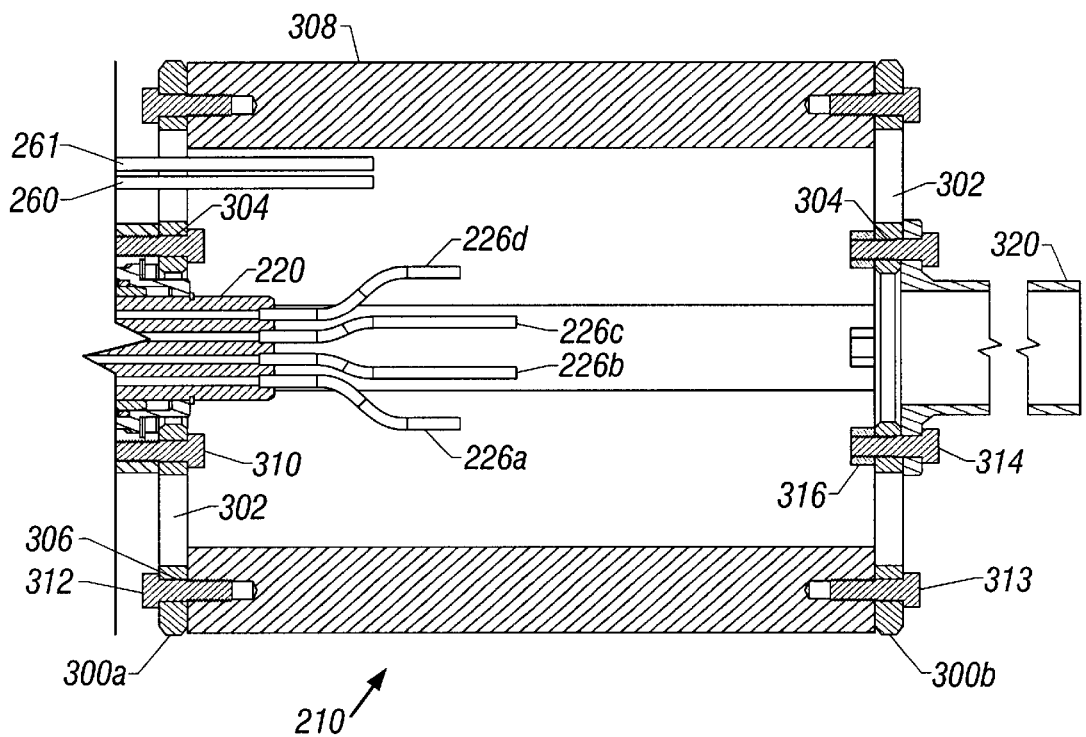
FIG. 8B shows a longitudinal sectional view of the guiding means at the rear end of the installation tool shown in FIG. 7.
Figure 9:
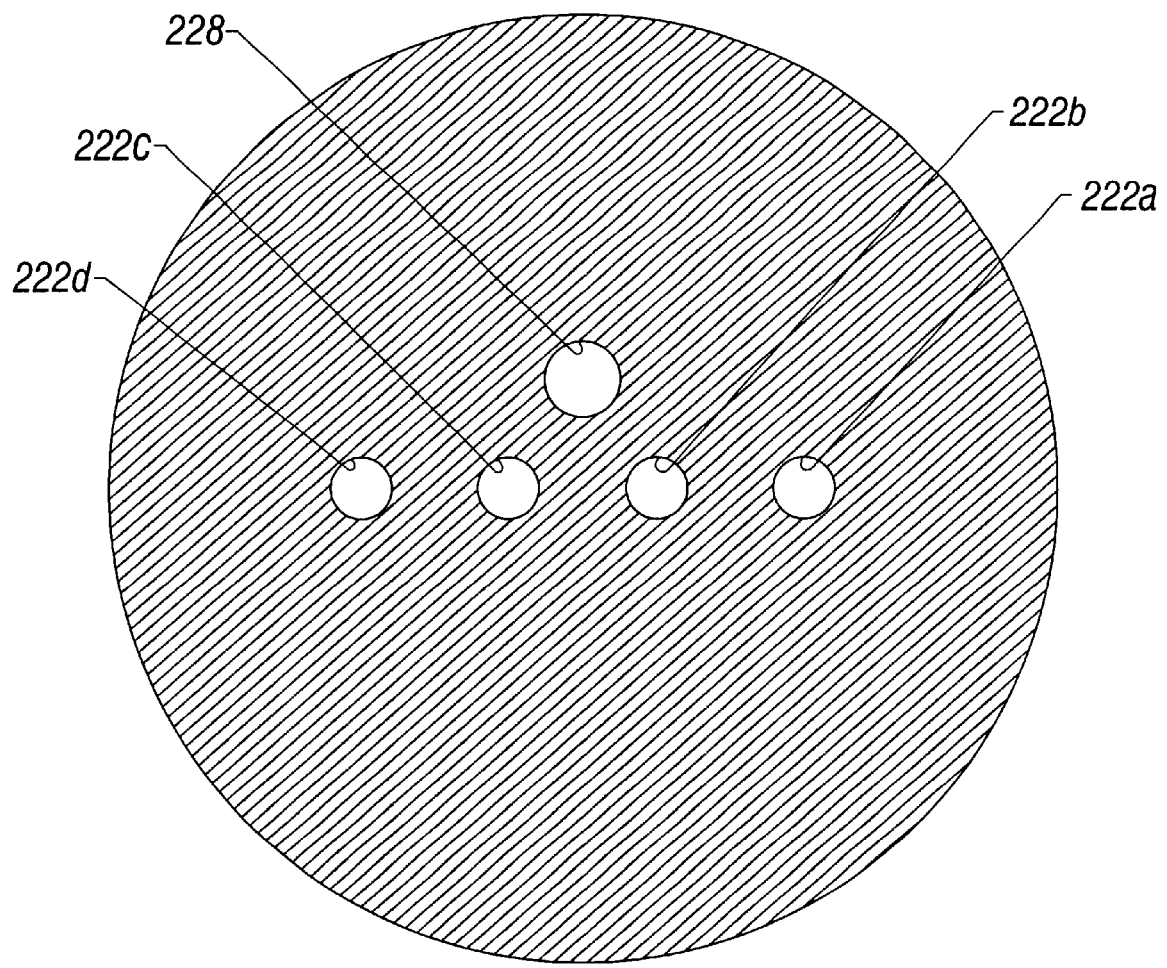
FIG. 9 is a transverse cross-sectional view taken along line 9—9 of FIG. 8A.

As shown in FIG. 8B, the outer ends of flow ports 222a,b, c, d are connected by brazing or other suitable means to tubings 226a,b, c,d which are in turn connected to control valves and pressure sources to selectively control pressurized fluid applied to the flow ports. A through hole 228, shown only in FIG. 9, is gundrilled parallel to the axis of stinger 220. This through hole 228 permits the stinger to enter and exit the blind interior bore of sealing plug 10 without becoming fluid locked, since it provides free fluid communication between the outer side of the sealing plug 10 and its blind interior bore. Since the stinger 220 has annular seals, either fluid or the stinger would become trapped in the blind bore of plug 10 without the balancing flow possible through hole 228.

Latch split ring 230 is machined so that its outer diameter matches the larger diameter and its bore matches that of the reduced diameter of the stinger 220. The external profile of latch split ring 230 is configured to mate with latchable female groove 164 of body 160 of sealing plug 10. The ring has a short length in its axial direction and transverse shoulders with bevels on its external corners. Latch split ring 230 is split so that it can be forcibly expanded elastically into latch groove 164 of body 160 of the sealing plug 10, but will be self retracting to its machined size when the forcing means is removed. The bevels are configured to match the corresponding bevels of latch groove 164.

Figure 10:
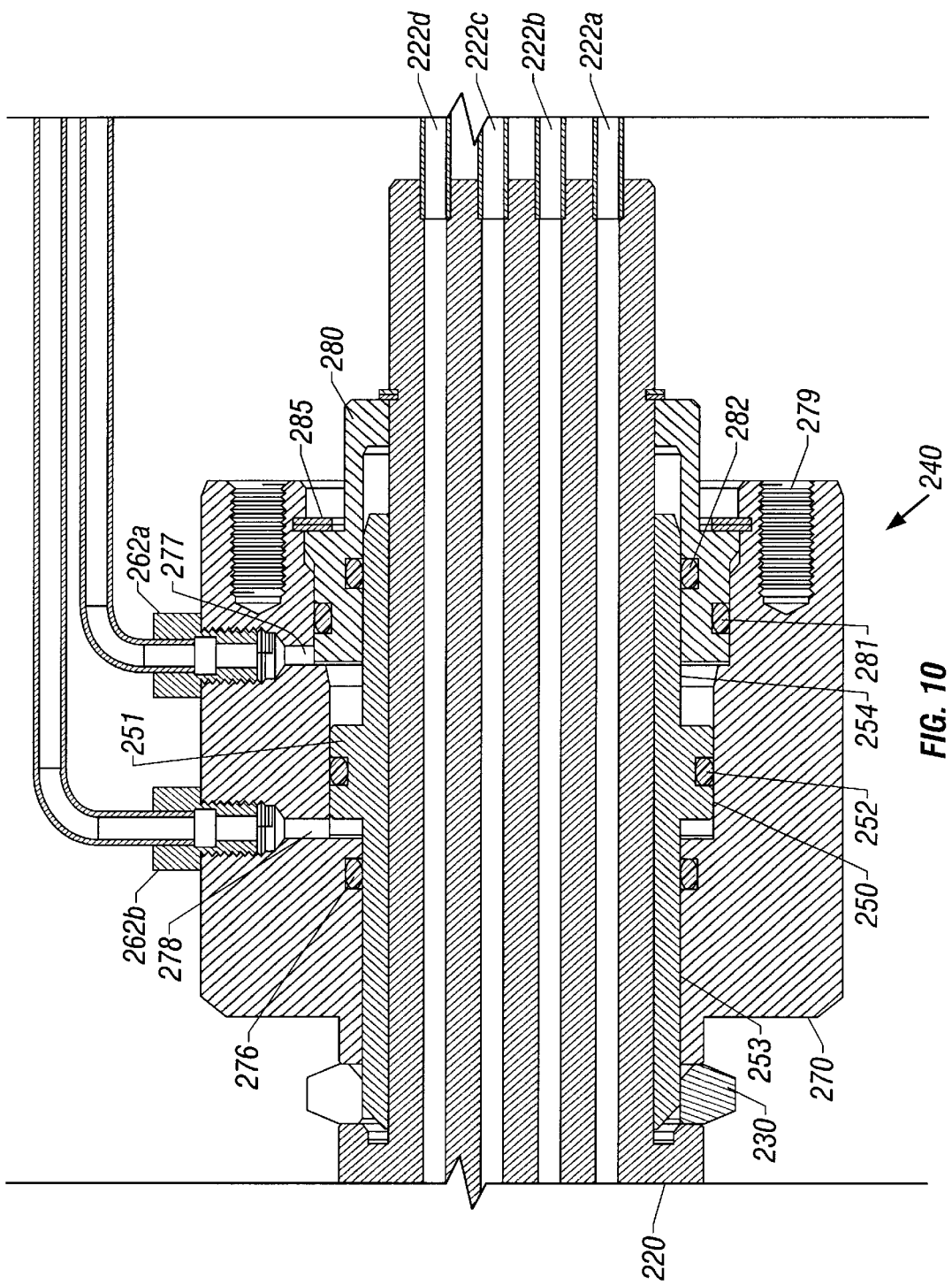
FIG. 10 is an enlarged longitudinal sectional view of a latch activator assembly of the installation tool shown in FIG. 7.

Referring now to FIG. 10, latch activator assembly 240 is of annular construction and consists of a cylinder 270 and piston 250 mounted on stinger 220, plus hydraulic connections. Cylinder 270 has a large outer diameter cylindrical body with a reduced diameter nose on its forward end joined to the large diameter body by a transverse shoulder which serves as a locating shoulder when abutted against the outer transverse end of body 160 of sealing plug 10. The forward end of cylinder 270 serves as a transverse abutment for the snap ring 230, which is held between the forward end of cylinder 270 and the intermediate transverse shoulder of stinger 220. Double acting cylinder 270 has, from its forward end, a through bore containing a female O-ring groove and O-ring 276, a first counterbore which serves as the cavity for a hydraulic piston, a second larger counterbore, and a third counterbore larger than the others which contains a female snap ring groove. Radial ports are provided to admit fluid to the cavity formed by first counterbore. Extend port 277 intersects the first counterbore on its outer end, while retract port 278 intersects on the forward end adjacent the transverse shoulder between the first counterbore and the through bore. On the outer transverse end of cylinder 270 is located a bolt circle of multiple tapped holes 279.

Cylinder end cap 280 has a stepped outer diameter with a first cylindrical section on its forward end fitting closely into the second counterbore of cylinder 270 and carrying a male O-ring groove and O-ring 281 which seals to said second counterbore, an enlarged second cylindrical section which on its forward side abuts the transverse shoulder between the second and third counterbores of cylinder 270, 25 and a reduced diameter third cylindrical section. The through bore of cylinder end cap 280 is a slip fit to the reduced diameter outer end of stinger 220 on its outer end, with a counterbore located on its forward end. The forward counterbore has the same diameter as that of the first counterbore of cylinder 270 and contains a female O-ring groove and O-ring 282.

First snap ring 285 is engaged in the female groove at the outer end of the third counterbore of cylinder 270 and abuts against the transverse shoulder of cylinder end cap 280 between its second and third cylindrical sections, thereby retaining the cylinder end cap within cylinder 270. Second snap ring 286 is engaged in the male snap ring groove of stinger 220 and serves to retain the latch activator assembly 240 by abutting against the outer transverse end of cylinder end cap 280 on the outer side. It should be noted that both snap rings 285 and 286 can be replaced by threaded connections without changing the scope of this invention.

Piston 250 is of annular construction with a through bore which is a slip fit over the reduced diameter outer end of stinger 220. The piston head 251 of piston 250 is centrally positioned on its exterior and contains a male O-ring groove with O-ring 252 which seals to the first counterbore of cylinder 270. The forward rod 253 and the outer rod 254 of piston 250 have the same diameter and are sealed against respectively by O-rings 276 and 282, so that a piston extension chamber intersected by extend port 277 is formed between O-rings 252 and 282, while a piston retraction chamber intersected by retract port 278 is formed between O-rings 276 and 252. The forward end of forward rod 253 has a substantial bevel so that, when the piston 250 is extended, the end of forward rod 253 engages a comating bevel at the intersection of its outer face and its inner diameter and thereby forces latch split ring 230 to be expanded and consequently be able to engage the latchable female groove 164 of body 160 of sealing plug 10. Retracting piston 250 permits latch split ring 230 to retract by springing back to its at rest position, thereby permitting release of the installation tool 200 from the sealing plug 10.

Extend port tubing 260 is connected to the external end of extend port 277 by fitting 262a, while 20 retract port tubing 261 is correspondingly connected to retract port 278 by fitting 262b. Selective application of hydraulic pressure and flow to the tubes causes the piston 250 of the latch activator assembly 240 to reciprocate to operate. As for the hydraulic conduits in the stinger 220, the operating valves and pump are not shown, but typical systems are well known and widely available.

Guide means 290, as illustrated in FIG. 8B, is necessary to pilot the sealing plug into position inside the necked half of the hot tap fitting 180 so that the sealing plug is centralized and prevented from cocking within the bore of any attached branch pipe, valve, or the bore of the neck 181 of the hot tap fitting 180. Guide means 290 consists of diaphragms 300a,b, multiple spreader bars 308, an insertion tube 320, and associated fasteners.

Diaphragms 300a,b are identical circular plates with outer diameters that are slightly smaller than the bores of the branch pipe and valve and neck of the hot tap fitting branch bore. The diaphragms are chamfered to avoid hanging on small diameter changes or bore offsets. Thus, the diaphragms are configured so that they can readily pass through these bores and will centralize in those bores. A central hole is provided in the diaphragms to permit passage of installation tool tubings 226a,b,c,d, while an array of lightening holes which serve as flow passages 302 permit passage of the extend and retract tubings 260 and 261. Inner bolt hole circle 304 corresponds to the threaded holes 279 on the outer end of cylinder 270 of latch activator assembly 240, while outer bolt hole circle 306 is located on the periphery of the diaphragms.

Spreader bars 308 are rods with both ends tapped. The spreader bars are used to provide sufficient spacing between the guiding diaphragms 300a,b so that the installation tool 200, either with or without sealing plug 10, will not be prone to cocking. The spacing between diaphragms 300a,b will typically be approximately equal to the diameter of bore 181.

Inner machine screws 310 are inserted through the inner bolt hole circle 304 into the threaded holes 279 to connect the forward diaphragm 300a to the latch activator assembly 240. Outer machine screws 312a connect the forward diaphragm 300a to the forward end of the spreader bars 308, while outer machine screws 313 connect diaphragm 300b to the outer end of the spreader bars.

Insertion tube 320 has a flanged forward end and a central bore to contain the hydraulic control lines for the overall assembly. A bolt circle on the flange of insertion tube 320 corresponds to the inner bolt circle holes 304 of diaphragm 300b. Bolts 314 and nuts 316 are installed through these matching holes to attach the insertion tube 320 to diaphragm 300b. The insertion tube 320 may be held by a manipulator or attached to a pumpable pig device with either an autonomous or externally controlled hydraulic operator system.

C. Operation of the Invention

The installation, in-service sealing, and retrieval of this sealing plug are described herein. Prior to the typical installation of the sealing plug of this invention, a hot tap fitting is installed on a pipeline and a special hole saw is used to cut a window in the pipeline through the neck bore 181 of the hot tap fitting. After the removal of the coupon cut by the hole saw and the saw itself, the seal plug can be installed.

To prepare the sealing plug for installation, the stinger 220 of the installation tool 200 is inserted into the sealing plug 10. The stinger 220 is inserted into the bore 162 of body 160 and bore 136 of bore cap 130 until the large transverse shoulder on the forward end of cylinder 270 of latch activator assembly 240 of installation tool 200 abuts the outer transverse shoulder of body 160 of sealing plug 10. The size of the chamfered diaphragms 300a,b and their spacing apart due to spreader bars 308 renders the installation tool 200 resistant to cocking in bore 181, either with or without plug 10 attached.

Initially during insertion, the latch split ring 230 of installation tool 200 is retracted. As shown in. FIG. 10, once the stinger 220 is in place, hydraulic pressure is applied to extend port 277 of cylinder 270 of the latch activator assembly 240 forcing the piston 250 forward. As piston 250 moves forward, the forward rod 253 of piston 250 is forced underneath the latch split ring 230 causing it to expand. As latch split ring 230 expands, it enters into latchable female groove 164 of body 160 of sealing plug 10. Once the latch split ring 230 is anchored in the latchable female groove 164, the installation tool 200 can push or pull on the sealing plug without being separated from it. The installation tool is manipulated by linearly positioning it within a pipe or housing module by means of axial force applied to the insertion tube 320 and hydraulic pressure applied to either the extend tubing 260 or the retract tubing 261.

Figure 11:
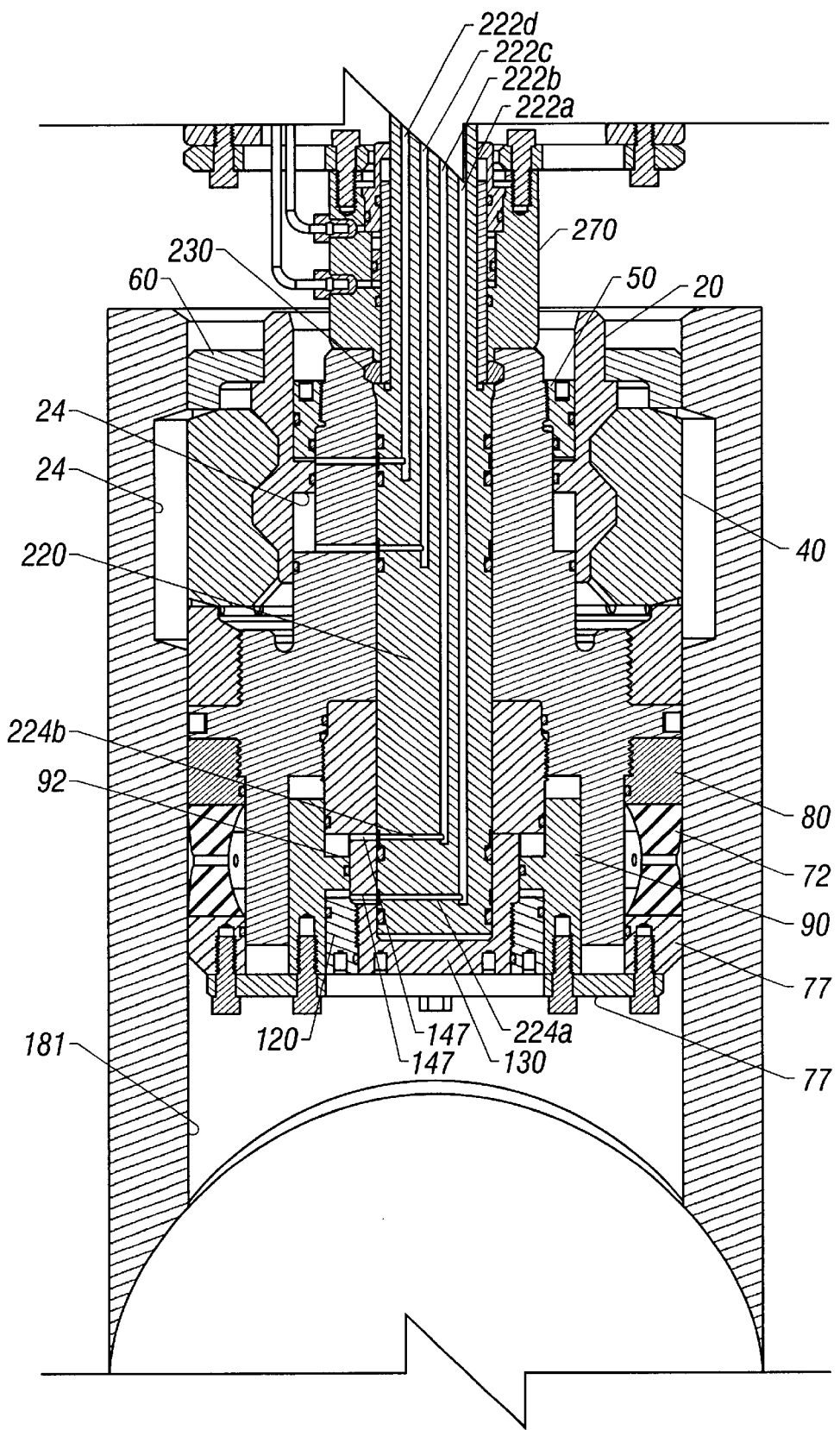
FIG. 11 is a longitudinal sectional view showing the insertion of the sealing plug into the branch bore of a hot-tap fitting with the installation tool attached to the sealing plug.

Referring now to FIGS. 6 and 11, the installation tool 200 is shown engaged into the sealing plug 10 and the seal plug has been manipulated by the installation tool so that it can installed. In order to do this, hydraulic pressure is applied to tubing 226b of the installation tool and, hence, to ports 222b, 224b and 147, while pressure is vented from tubing 226 and ports 222a, 224a and 148. Because transverse port 224b communicates with port 147 of the sealing plug 10, the application of hydraulic pressure through transverse port 224b will apply pressure to bulkhead 92 of piston 90 causing it to move forward. As bulkhead 92 moves forward, its motion is transferred to load transfer washer 110 and moveable seal end 77. Consequently, seal 72 is stretched so that its outer diameter is less than that of adjacent portions of sealing plug 10, thereby causing it to readily pass through the bore 181 of the necked half of the hot-tap fitting 180 and hence to be protected from rubbing, chafing, and tearing. The stroke of piston 90 is limited to avoid overstressing seal 72.

At the same time, either no pressure is applied to either tubings 226c or 226d or, alternately, hydraulic pressure is applied only to tubing 226c and tubing 226d is vented. In this manner, latch piston 20 is held in its outer position and latch dogs 40 remain recessed within the latch dog housing 60. In this state, as shown in FIG. 6, the sealing plug may be inserted through the bore of neck 181 and positioned until latch dogs 40 are adjacent female groove 182 of the necked half of the hot tap fitting 180.

Figure 12:
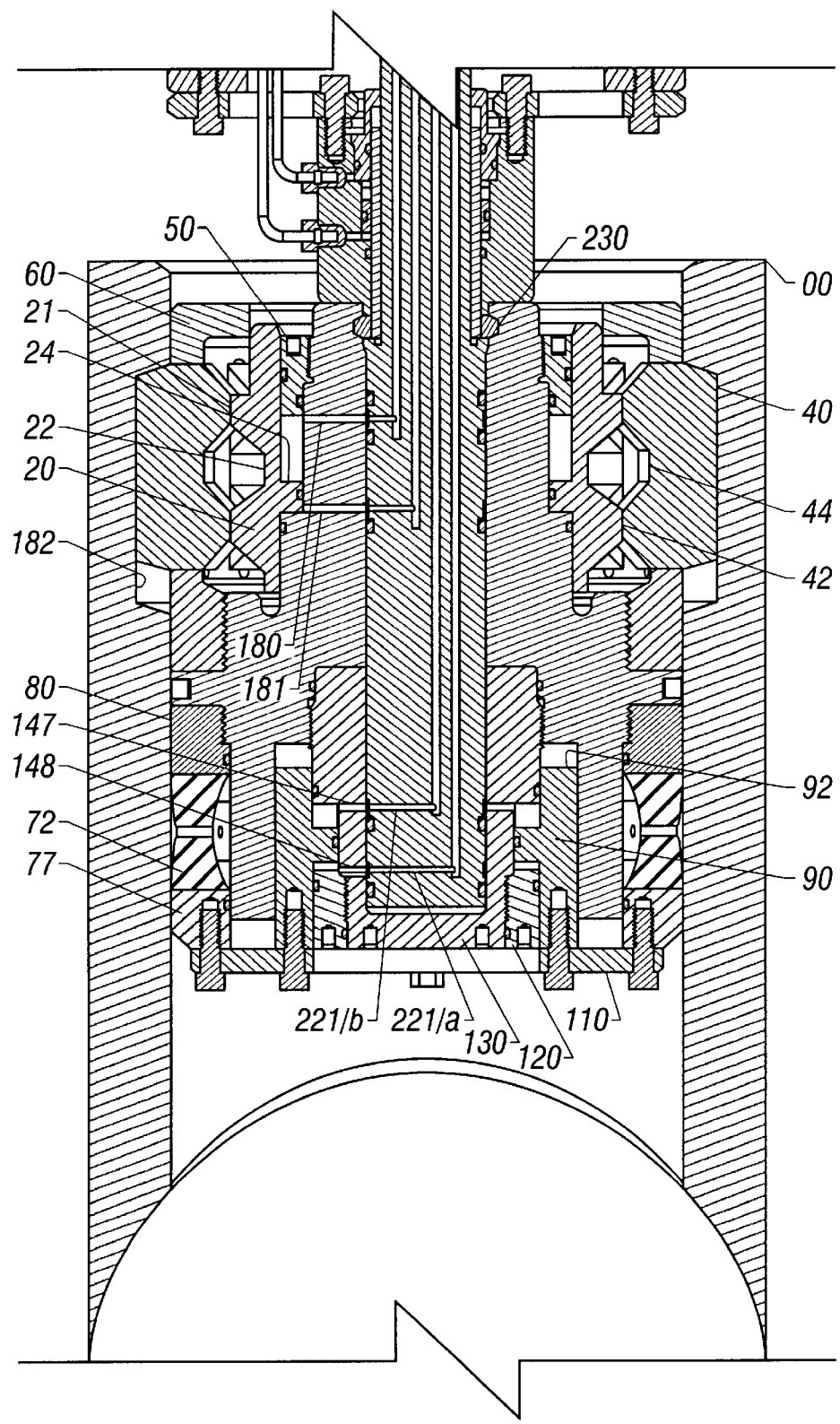
FIG. 12 is similar to FIG. 11 but shows the sealing plug latched into the neck bore of a hot-tap fitting and the molded bidirectional seal stretched.

The next step in the sealing plug 10 installation latches the plug 10 into the female groove 182 in the neck bore 181 of the necked half of the hot tap fitting 180, as shown in FIG. 12. The latch dogs 40 are expanded to engage groove 182 whenever hydraulic pressure is selectively applied to tubing 226d, gundrilled hole 222d, transverse port 224d, and first radial flow port 180 so that pressure is communicated to act on the outer side of transverse bulkhead 24 of piston 20, thereby shifting the piston 20 forward. As piston 20 moves forwardly, the conical shoulders between the lands 42 and groove 44 of the latch dogs 40 are forced outwardly by the comating conical shoulders between the lands 21 and grooves 22 of the piston 20, so that, upon completion of the stroke of the piston, the lands 42 of the latch dogs 40 are supported by the lands 21 of the piston 20. In this condition, the latch dogs are held in their radially extended latching position. The piston will remain in this position without the need to maintain its actuating pressure until the pressure is selectively reversed by venting tubing 226d and pressurizing tubing 226c. The reaction of the extended conical shoulders of latch dogs 40 against the comating conical ends of female groove 182 keeps the sealing plug 10 in position when it is subjected to axial forces due to differential pressures.

Figure 13:
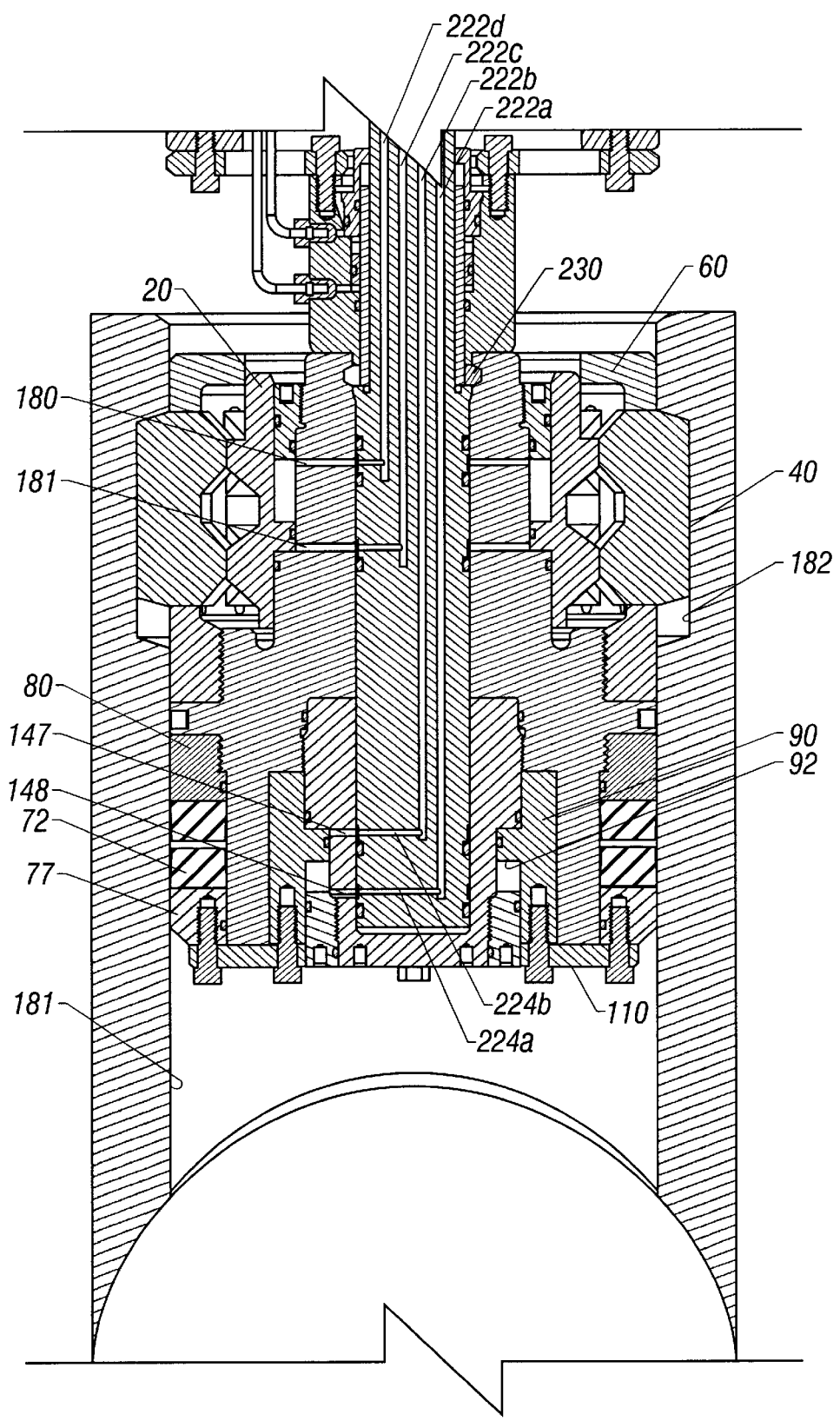
FIG. 13 is similar to FIG. 12 but shows the molded bidirectional seal relaxed and set against the neck bore of hot-tap fitting.

FIG. 13 shows the next stage in the installation of the sealing plug 10 into neck bore 181 of the hot tap fitting. In order to seal between sealing plug 10 and neck bore 181 of the hot tap fitting, the seal must be released from its stretched position of FIGS. 11 and 12. This is accomplished by venting tubing 226b, so that stretching force applied to seal 72 by piston 90 and linking parts is released. The elasticity of seal 72 causes it to attempt to return to its unstressed state when the stretching force is released, so that it presses against neck bore 181 in order to permit sealing. Because the radial thickness of stretched elastomeric seal 72 is reduced from its largest diameter to its inner end where it is bonded to movable seal end 77 and seal anchor 80, the released seal on the side of moveable seal end 80 will smoothly fill the annular seal gap from where it first rebounds against the bore 181 at the center of the seal up to the point at which interference ceases. This ensures high presqueeze without voids.

The diameter and ovality of neck bore 181 are constructed to lie within a known range. Thus, the outer diameter of the seal 72 can be molded sufficiently larger than the maximum size of bore 181 to ensure a strong interference fit. In the process of attempting to return to its molded shape from its stretched position, the elastomeric seal assumes a position such that it conforms to the local contours of the neck bore 181 and presses strongly against it to effect a highly pre-loaded interfacial contact ('presqueeze').

It is also possible to apply hydraulic pressure to tubing 226a, gundrilled hole 222a, ports 224a and 148 and, thus, to bulkhead 92 of piston 90 while tubing 226b is vented, thereby urging the seal 72 to overcome axially directed friction against neck bore 181. This compressing of seal 72 assists in ensuring maximal interfacial forces and contact between seal 72 and neck bore 181, so that presqueezing and sealing capabilities are enhanced. Seal 72 is configured to be capable of bidirectional sealing, as described in copending U.S. patent application Ser. No. 09/788,791.

Figure 14:
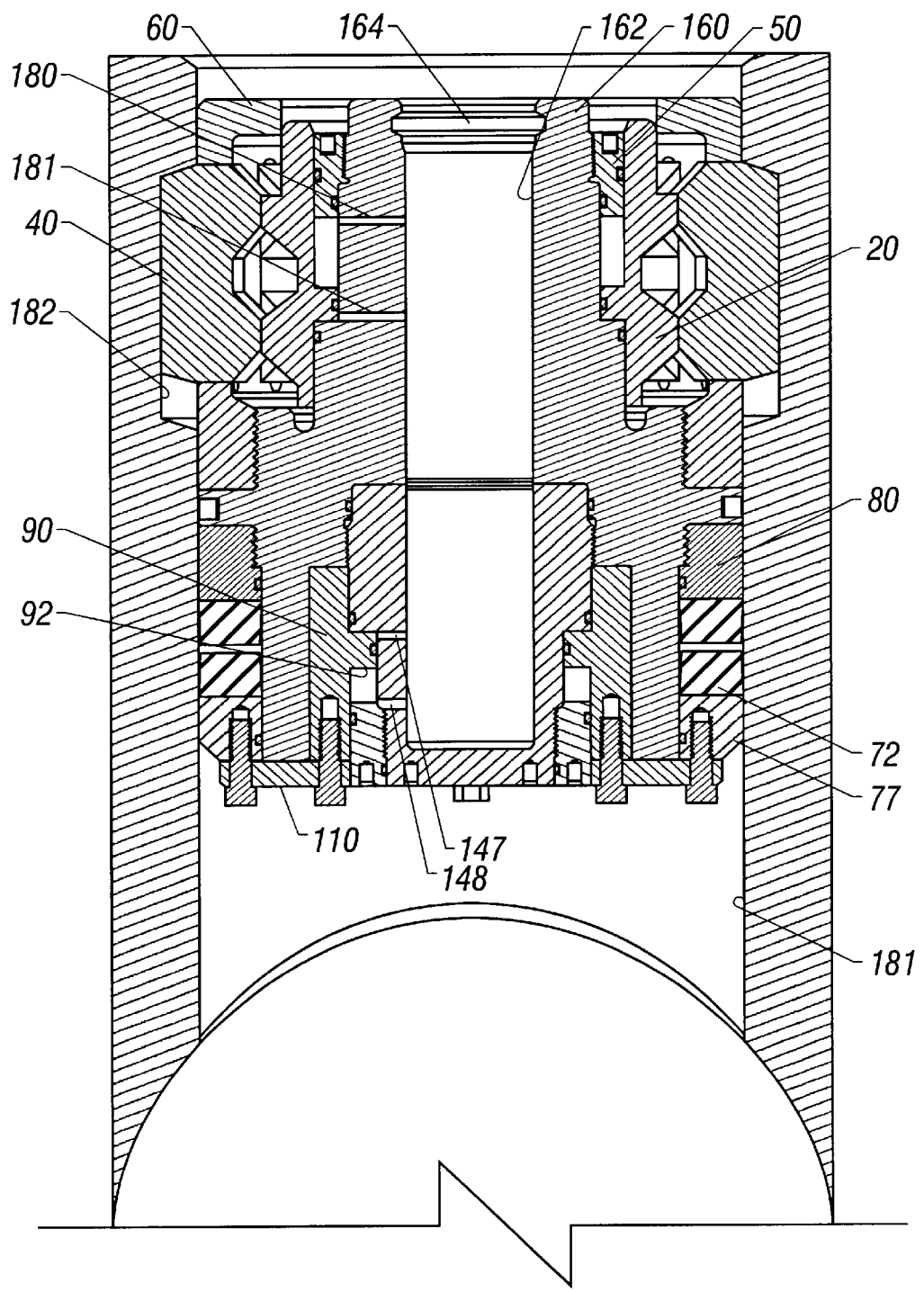
FIG. 14 is similar to FIG. 13 but the installation tool has been removed.

The final step in installation of sealing plug 10 is to release the installation tool 200 from plug 10. This is done by releasing latch split ring 230 by applying pressure to retract port 278 and venting extend port 277 of the cylinder 270 of latch activator assembly 240. This pressure reversal causes piston 250 of cylinder 270 to move outwardly, thereby permitting latch split ring 230 to retract to its unstressed position so that installation tool 200 is no longer latched to groove 164 of sealing plug 10. Following retraction of latch split ring 230, the installation tool 200 can be removed from the sealing plug 10 and recovered. This installed condition of the sealing plug 10 without the installation tool 200 inserted is shown in FIG. 14.

When the initial pressure on one side of seal 72 in the gap between bore 181 and plug 10 is higher than on the other side, the higher pressure acting on seal 72 causes the high pressure side cusp adjacent to the central external annular groove 73 to temporarily lift from the surface of bore 181 sufficiently to admit that pressure to reach the central annular groove 73, the multiple radial connecting ports 74, and the interior face 75. At the same time, the other cusp does not lift, so that the pressure is transmitted only to the outer cylindrical surface of the seal, where it is entrapped by O-ring seals 71 and 78. In this manner the entrapped pressure serves as a pressure bias to maintain a high interfacial contact force between the low pressure side cusp and bore 181. The same sequence of pressure entrapment occurs when the pressure is higher on the other side of the seal 72. The seal 72 will entrap and retain the highest pressure to which it has been exposed as a pressure bias on its outer diameter cylindrical face. Normally both the first and the highest pressures to which a seal in a completion plug is exposed come from the interior of the pipe hot-tap fitting. In the event of a bleeding off of the line pressure in the pipe, the seal will experience a pressure reversal. If the retained pressure on the inner side 75 of seal 72 is sufficiently high, the friction of the seal with bore 181 will be sufficient to avoid seal leakage during pressure reversal. This will be the case even though the moveable seal end 80 is free to shift under load and would eventually lead to loss of sealing if the reverse pressure was sufficiently high. The requirement for a high coefficient of seal friction is the reason for choosing an elastomer compounding with appropriate friction properties and the possible addition of friction enhancing fillers for seal 72.

The sealing plug 10 can be uninstalled by reversing the sequence of operations used for installation. The steps for uninstalling are relatching the installation tool 200 into the sealing plug 10, applying pressure to restretch the seal 72 and thereby release any retained seal pressure, applying pressure to shift piston 20 outwardly so that latch dogs 40 retract, and then withdrawing the installation tool with its attached sealing plug 10.

Unidirectional seal assembly 370, shown in FIG. 15, is stretched for plug 10 insertion or retrieval similarly to the bidirectional seal assembly 70. An unidirectional seal may be used for reasons of economy. When elastomeric seal 372 is stretched by the action of piston 90, its outer diameter is reduced to less than that of the adjacent seal anchor 380 and moveable seal end 377, as well as bore 181. Accordingly, seal 372 is not susceptible to scuffing or cutting during installation or retrieval from bore 181.

When unidirectional seal 372 is released to rebound by removing the differential pressure on piston 90, the portion of the seal which has the largest molded diameter will contact the bore 181 first and then the rest of the seal on the moveable seal end will progressively contact the bore 181 from the point of initial contact. If desired, pressure can be applied through port 148 to cause piston 90 to urge seal 372 more fully against bore 181 by overcoming frictional resistances to seal rebound. The result is a very high presqueeze of seal 372 against bore 181 and an attendant improvement in sealing capacity. This level of presqueeze is far higher than that practical for normal seals. Further, maintenance of this presqueeze is less sensitive to elastomer volume decrease or creep than for seals which must be squeezed into sealing contact from their relaxed positions.

The unidirectional seal of FIG. 15 is configured to be radially outwardly pressure biased by pressure differentials in their normal pressure conditions with internal pressure from the interior of the hot-tap fitting. This pressure biasing is effected by providing an isolated pressure path from the region of retained high pressure (to the left) to the inner diameter side 383 of elastomeric seal 372. For the unidirectional seal unit 372, the bias pressure path is between moveable seal end 377 and the forward cylindrical section 179 of body 160, since there is no O-ring on the inner face of moveable seal end 377. The region of the sealing interface between bore 181 and elastomeric seal 372 is considered to start at the line of initial contact of the elastomer with the pipe on the high pressure side of the seal. A monotonic gradation in pressure between the high pressure and the low pressure across the seal exists across this region of the sealing interface. Accordingly, there will be a pressure differential between the inner diameter face 383 which is exposed to the full high pressure and the outer diameter face of elastomeric seal 372 on the low pressure side of the initial high pressure line of contact. This pressure differential acts in a radially outward direction on the elastomeric seal 372 to compel higher interfacial pressures between the elastomer and the bore 181, thereby enhancing the resistance of the sealing interface to escape of pressure through the interface. This condition is termed pressure bias for the seal.

In the case of reverse (i.e., external) pressures for the unidirectional seal 372, the pressure bias is reversed, since the inner diameter face 383 of elastomeric seal 372 is exposed to low pressure in such a case. The pressure bias then acts radially inwardly and tends to reduce the interfacial pressure between elastomeric seal 372 and bore 181. However, the elastomer on the outer diameter face of elastomeric seal 372 is initially limited in its range of radially inward distortion by abutting against the cylindrical section 179 of body 160 and friction due to high seal presqueeze. The result is that the reversal of the pressure on the seal 372 does not result in loss of sealing until the effect of presqueeze is overcome.

The sealing capabilities of the two types of stretchable seal assemblies 70 and 370 described herein are independent of the means of axially restraining the sealing plug 10 within the tubular bore 181. Accordingly, the two types of stretchable seal assemblies 70 and 370 can be used with other types of sealing plug restraints. For example, the seals of the present invention could be used with plugs fixed in position by slip dogs, flange stops, abutments, or other means. Because of the very high presqueeze on the elastomeric seals provided by the seal configuration and method of seal manipulation of this invention, in some cases the friction of the seals alone will resist movement of a significant pressure-induced axial thrust on the sealing plug.

D. Advantages of This Invention

There are numerous advantages of this invention over other currently available sealing plugs. For example, the sealing plug device described herein is particularly applicable for use as a completion plug for pipeline hot-taps. It is designed to be installable and removable in subsea environments using robots or remote manipulators using the hydraulically actuated installation tool. In addition, the sealing plug can be inserted and removed without cocking or otherwise jamming in the bores through which it is traversed. Furthermore, the sealing plug can be installed and removed without scuffing or damaging either the seal or the neck bore of the hot-tap fitting. Both the unique seal embodiments that are used have a nontrivial bidirectional sealing capability, and due to pressure biasing, they are highly resistant to leaking. Additionally both seal embodiments are more resistant to leakage due to seal volume change or creep than conventional seals. Both reliable setting and release of the seals and latch dogs are offered by these designs. Use of the simple and reliable hydraulically controlled installation tool significantly simplifies plug manipulation so that remote operation is highly feasible. Further, the avoidance of external holes in the hot-tap fitting helps to increase leakage reliability of the system.

As may be understood by those skilled in the art, some details of this invention may be modified without departing from the scope of this invention.

What is claimed is:

1. A completion plug for sealing off a hot-tap fitting comprising:
   (i) a body assembly;
   (ii) a sealing assembly having:
      an annular elastomeric seal;
      a static seal end, bonded to a one end of the elastomeric seal on an inner side of the static seal end and anchored to the body assembly on an outward side of the static seal end;
      a movable seal end, bonded to a second opposed end of the elastomeric seal, wherein when said movable seal end is displaced in a direction going away from the static seal end the elastomeric seal is tensioned and when the movable end is moved back towards the static seal end the tension on the seal is relaxed;
   (iii) a first reciprocable piston housed within the body assembly and connected to the movable seal end, said piston movable between a first position and a second position, wherein when said piston is in the first position the elastomeric seal is tensioned and when the piston is in the second position the elastomeric seal is relaxed; and
   (iv) means for moving the piston between the first and second position.

2. The completion plug of claim 1, wherein the means for moving the first piston between the first and second position is a hydraulic cylinder having a first and second hydraulic chamber, wherein when hydraulic pressure is applied to the first hydraulic chamber the piston moves to the first position thereby tensioning the elastomeric sealing element, and when hydraulic pressure is applied to the second hydraulic chamber the piston moves towards the second position thereby relaxing the tension on the sealing element.

3. The completion plug of claim 1, further comprising a plurality of radially extensible latch dogs housed within the body assembly and a second reciprocable pressure-responsive piston housed within the body assembly, said piston movable between a first position and a second position, wherein when said second piston is in the first position the latch dogs are retracted within the body assembly, and when the second piston is in the second position a portion of the latch dogs are extended outside of the body assembly.

4. The completion plug of claim 1, wherein when the elastomeric seal is tensioned the seal does not extend beyond the periphery of the body assembly, whereby radial interference between the seal and a bore of a hot-tap fitting is minimized during positioning of the sealing plug in the bore of the hot-tap fitting.

5. The completion plug of claim 4, wherein when the elastomeric seal is installed in the bore of the hot-tap fitting and the tension on the elastomeric seal is eased, the seal has substantial radial interference with the bore of the hot-tap fitting.

6. A completion plug for a hot-tap fitting comprising:
   (i) a cylindrical body assembly;
   (ii) an elastomeric seal assembly including an annular seal with an anchored end and a moveable end, wherein when the moveable seal end is axially moved to a first position the seal is axially stretched and when the movable end is moved to a second position the seal is relaxed;

(iii) means for reciprocably moving said movable end between the first and second position;

(iv) a plurality of radially extensible latch dogs housed within the body assembly, wherein said latch dogs are retractable to an inside position within the body assembly and extendable to an outside position wherein a portion of the latch dogs extend outside of the body assembly; and (v) axially reciprocable means for moving the latch dogs radially between the inside and the outside position.

7. The completion plug of claim 6, wherein the means for reciprocably moving said movable end is a hydraulically actuated piston.

8. The completion plug of claim 6, wherein the cylindrical body assembly has a concentric bore which extends partially through the body assembly, said bore having a latch groove at a first end.

9. The completion plug of claim 6, wherein the means for radially moving the latch dogs between the inside and outside position is a hydraulically actuated piston.

10. The completion plug of claim 9, wherein said piston has an outside camming surface, said camming surface operable in a first axial direction to move the latch dogs into the outside position, said camming surface operable in a second axial direction to permit said dogs to return to the inside position.

11. An installation apparatus for installing or retrieving a plugging device in a tubular flow passageway comprising:

(a) a cylindrical stinger configured to fit within a concentric blind bore of a cylindrical sealing plug, said stinger having an elongated body with multiple stinger flow ports, wherein when said stinger is engaged in the bore of the sealing plug, each stinger flow port selectively communicates pressure to a corresponding bore flow port in the bore of the sealing plug;

(b) an expandable latch split ring for selectably securing or releasing said stinger to the sealing plug, said split ring is positioned on an exterior surface of the stinger and is configured to securely fit into a latch groove in the blind bore of the sealing ping when said split ring is expanded; and (c) means for positioning the sealing plug attached to the stinger into the tubular flow passageway.

12. The installation apparatus of claim 11, wherein the stinger flow ports run parallel to the elongated axis of the stinger.

13. The installation apparatus of claim 11, wherein each stinger flow port is of a specific length and communicates with an exterior surface of the stinger through a transverse port intersecting said flow port.

14. The installation apparatus of claim 11, wherein when said split ring is fitted into the latch groove in the bore of the sealing plug each stinger flow port is aligned with a specific bore flow port.

15. The installation apparatus of claim 12, further comprising a through hole running parallel to the stinger elongated axis, said through hole providing fluid communication to avoid pressure-locking between an outer side of the stinger and the bore of the sealing plug during installation and retrieval of the installation apparatus from the bore of the sealing plug.

16. A plugging device for a hot-tap fitting comprising:
(a) a cylindrical sealing plug including
(i) a cylindrical body assembly having a concentric blind bore;
(ii) an elastomeric seal assembly comprising an annular seal with an anchored end and a moveable end, wherein when the moveable seal end is axially moved to a first position the seal is axially stretched and when the movable end is moved to a second position the seal is relaxed;
(iii) means for reciprocably moving said movable end between the first and second position; and
(b) an installation tool for installing or retrieving the sealing plug in a neck bore of a hot-tap fitting comprising:
(i) a cylindrical stinger configured to fit within the blind bore of the sealing plug, said stinger having an elongated body with multiple stinger flow ports, wherein when the stinger is engaged in the bore of the sealing plug, each stinger flow port selectively communicates pressure to a corresponding bore flow port in the bore of the sealing plug;
(ii) an expandable latch split ring for selectably securing or releasing said stinger to the sealing plug said split ring is positioned on an exterior surface of the stinger and is configured to securely fit into a latch groove in the blind bore of the sealing plug when said split ring is expanded; and
(iii) means for guiding the sealing plug attached to the stinger into position in the bore of the hot-tap fitting.

17. A plugging device for a hot-tap fitting comprising:
(a) a cylindrical sealing plug including
(i) a cylindrical body assembly having a concentric blind bore, said bore having a latch groove at a first end;
(ii) an elastomeric seal assembly including an annular seal with an anchored end and a moveable end, wherein when the moveable seal end is moved away from the anchored end the seal is stretched and when the movable end is moved toward the anchored end the seal is relaxed;
(iii) a first reciprocable piston housed within the body assembly connected to the moveable seal end, said first piston movable between a first position and a second position, wherein when said first piston is in the first position the elastomeric seal is stretched and when the first piston is in the second position the elastomeric seal is relaxed;
(iv) a first hydraulic cylinder having a first and second hydraulic chamber, wherein when hydraulic pressure is applied to the first hydraulic chamber the first piston moves to the first position and stretches the elastomeric sealing element, and when hydraulic pressure is applied to the second hydraulic chamber the first piston moves towards the second position and relaxes the tension on the sealing element;
(v) a plurality of radially extensible latch dogs housed within the body assembly, wherein said latch dogs are retractable to a retracted position within the body assembly and extendable to an extended position wherein a portion of the latch dogs extend outside of the body assembly;
(vi) a second reciprocable piston housed within the body assembly, said second piston having an outside camming surface, said camming surface operable in a first axial direction to permit the latch dogs to move into the retracted position and said camming surface operable in a second axial direction to move said latch dogs into the extended position; and (vii) a second hydraulic cylinder having a first and second hydraulic chamber, wherein when hydraulic pressure is applied to the first hydraulic chamber the second piston moves in the first axial direction, and when hydraulic pressure is applied to the second hydraulic chamber the second piston moves in the second axial direction; and (b) an installation tool for installing the sealing plug in a hot-tap fitting comprising:

(i) a cylindrical stinger configured to fit within the blind bore of the body assembly, said stinger having an elongated body with multiple stinger flow ports running parallel to an elongated axis of the stinger, wherein each stinger flow port is of a specific length and communicates with an exterior surface of the stinger through a specific transverse port intersecting said stinger flow port;

(ii) an expandable latch split ring, said split ring positioned on an exterior surface of the stinger and configured to securely fit into the latch groove in the blind bore of the body assembly when the split ring is expanded, wherein when said split ring is fitted into the latch groove in the bore of the body assembly each transverse port of the stinger aligns and communicates with a specific bore flow port leading from the bore of the body assembly to one of the hydraulic chambers controlling the operation of the first or second pistons;

(iii) a through hole in the stinger running parallel to the elongated axis of the stinger, said through hole providing fluid communication to prevent pressure-locking between the exterior surface of the stinger and the bore of the sealing plug; and (iv) means for guiding the sealing plug attached to the stinger into position in a neck bore of a hot-tap fitting, said means for guiding having a sufficient axial length to minimizing cocking of the sealing plug within the hot-tap fitting.

18. A process for sealing a tubular passageway against pressure and flow, said process comprising:

(a) selecting the tubular passageway to be sealed by a sealing plug, said sealing plug including:

(i) a cylindrical body element having an interior concentric blind bore;

(ii) a seal assembly consisting of an elastomeric annular seal with an anchored end and a moveable end, wherein when the moveable seal end is moved to a first position the seal is stretched and when the movable end is moved to a second position the seal is relaxed;

(iii) means for reciprocably moving said movable end between the first and second position; and (iv) a plurality of radially extensible latch dogs;

(b) attaching an installation tool to the sealing plug, wherein the installation tool comprises:

(i) a cylindrical stinger configured to fit within the blind bore of the sealing plug, said stinger having an elongated body with multiple stinger flow ports, wherein each stinger flow port selectively communicates pressure to a corresponding flow port in the blind bore of the sealing plug for controlling the means for reciprocably moving the moveable seal end and the latch dogs;

(ii) means for selectively securing said stinger to the sealing plug;

(iii) means for guiding the sealing plug attached to the stinger into position for sealing the tubular flow passageway;

(c) moving the movable end of the elastomeric seal to the first position, thereby stretching the elastomeric seal;

(d) positioning the sealing plug attached to the installation tool within the tubular passageway while the elastomeric seal is stretched; and (f) moving the elastomeric seal to the second position to relax the seal to bias the seal against the interior surface of the bore of the tubular passageway.

19. A process for sealing a tubular passageway against pressure and flow, said process comprising:

(a) selecting the tubular passageway to be sealed by a sealing plug, said sealing plug including:

(i) a cylindrical body element having an interior concentric blind bore;

(ii) a seal assembly consisting of an elastomeric annular seal with an anchored end and a moveable end, wherein when the moveable seal end is moved to a first position the seal is stretched and when the movable end is moved to a second position the seal is relaxed;

(iii) means for reciprocably moving said movable end between the first and second position;

(iv) a plurality of radially extensible latch dogs housed within the body element, wherein said latch dogs are retractable to a retracted position within the body element and extendable to an extended position wherein a portion of the latch dogs extend outside of the body element; and (v) means for moving latch dogs radially between the extended position and the retracted position;

(b) attaching an installation tool to the sealing plug, wherein the installation tool comprises:

(i) a cylindrical stinger configured to fit within the blind bore of the sealing plug, said stinger having an elongated body with multiple stinger flow ports, wherein each stinger flow port selectively communicates pressure to a corresponding flow port in the blind bore of the sealing plug for controlling the means for reciprocably moving the moveable seal end and the latch dogs;

(ii) means for selectively securing said stinger to the sealing plug;

(iii) means for guiding the sealing plug attached to the stinger into position for sealing the tubular flow passageway;

(c) moving the movable end of the elastomeric seal to the first position, thereby stretching the elastomeric seal;

(d) inserting the sealing plug into the tubular passageway while the elastomeric seal is stretched and the latch dogs are in the retracted position;

(e) moving the latch dogs to the extended position to bias against and engage an interior surface of a bore of the tubular passageway; and (f) moving the elastomeric seal to the second position to relax the seal to bias the seal against the interior surface of the bore of the tubular passageway.

20. A completion plug for a hot-tap fitting comprising:

(i) a cylindrical body assembly;

(ii) an elastomeric seal assembly including an annular seal with an anchored end and a moveable end, wherein when the moveable seal end is moved to a first position the seal is stretched and when the movable end is moved to a second position the seal is relaxed;

(iii) means for reciprocably moving said movable end between the first and second position;

(iv) a plurality of radially extensible latch dogs housed within the body assembly, wherein said latch dogs are retractable to an inside position within the body assembly and extendable to an outside position wherein a portion of the latch dogs extend outside of the body assembly; and (v) an axially reciprocable piston, wherein the piston has an outside camming surface, said camming surface operable in a first axial direction to move the latch dogs into the outside position, said camming surface operable in a second axial direction to permit said dogs to return to the inside position.

21. The completion plug of claim 20, wherein the cylindrical body assembly has a blind concentric bore which extends partially through the body assembly, said bore having a latch groove at a first end.

22. The completion plug of claim 20, wherein the piston is hydraulically actuated.

23. A completion plug for a hot-tap fitting comprising:

(i) a cylindrical body assembly;

(ii) an elastomeric seal assembly including an annular seal with an anchored end and a moveable end, wherein when the moveable seal end is moved to a first position the seal is stretched and when the movable end is moved to a second position the seal is relaxed;

(iii) means for reciprocably moving said movable end between the first and second position;

(iv) a plurality of radially extensible latch dogs housed within the body assembly, wherein said latch dogs are retractable to an inside position within the body assembly and extendable to an outside position wherein a portion of the latch dogs extend outside of the body assembly; and (v) an axially reciprocable piston, wherein the piston has an outside camming surface, said camming surface moveable between a first operable position to move the latch dogs into the outside position and a second operable position to permit said dogs to return to the inside position wherein an applied pressure is required to move the camming surface between the first and second operable positions.

* * * * *